US012802387B2

(12) United States Patent
Saito et al.

(10) Patent No.: US 12,802,387 B2
(45) Date of Patent: Nov. 17, 2026

(54) INFORMATION PROCESSING DEVICE, INFORMATION PROCESSING METHOD, AND INFORMATION PROCESSING PROGRAM FOR GENERATING, BASED ON FIRST INFORMATION, SECOND INFORMATION CORRESPONDING TO A SECOND TIME WHICH IS A TIME LATER THAN A FIRST TIME WHICH IS A TIME CORRESPONDING TO THE FIRST INFORMATION

(71) Applicant: Sony Group Corporation, Tokyo (JP)

(72) Inventors: Daisuke Saito, Kanagawa (JP); Masaki Sakakibara, Tokyo (JP); Yusuke Oike, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 370 days.

(21) Appl. No.: 18/566,117

(22) PCT Filed: Mar. 18, 2022

(86) PCT No.: PCT/JP2022/012525
§ 371 (c)(1),
(2) Date: Dec. 1, 2023

(87) PCT Pub. No.: WO2022/259688
PCT Pub. Date: Dec. 15, 2022

(65) Prior Publication Data

US 2024/0249496 A1 Jul. 25, 2024

(30) Foreign Application Priority Data

Jun. 11, 2021 (JP) ................................ 2021-098261

(51) Int. Cl.
*G06V 10/25* (2022.01)
*G06V 10/75* (2022.01)

(52) U.S. Cl.
CPC ............ *G06V 10/25* (2022.01); *G06V 10/751* (2022.01)

(58) Field of Classification Search
CPC ............................ G06V 10/25; G06V 10/751
See application file for complete search history.

(56) References Cited

U.S. PATENT DOCUMENTS 11,048,465 B2 * 6/2021 Nishide .................. H04N 25/76
2020/0126280 A1 * 4/2020 Amimoto ................ G06F 3/012
2020/0372260 A1 * 11/2020 Tagami ................... G06T 7/251

FOREIGN PATENT DOCUMENTS

JP H09-307883 A 11/1997
JP 2008-109336 A 5/2008
(Continued)

OTHER PUBLICATIONS

International Search Report and Written Opinion mailed on Jun. 14, 2022, received for PCT Application PCT/JP2022/012525, filed on Mar. 18, 2022, 9 pages including English Translation.
(Continued)

*Primary Examiner* — Stephen R Koziol
*Assistant Examiner* — Raven Simone Jones
(74) *Attorney, Agent, or Firm* — XSENSUS LLP

(57) ABSTRACT

An information processing device includes processing circuitry configured to acquire first information which is a part of information regarding a target region, which is sparse with respect to the information regarding the target region, and which corresponds to a plurality of portions discretely located in the target region; and generate, based on the first information, second information corresponding to a second time which is a time later than a first time which is a time corresponding to the first information.

18 Claims, 29 Drawing Sheets

(56) References Cited

FOREIGN PATENT DOCUMENTS

| | | | |
|---|---|---|---|
| JP | 2015-100075 | A | 5/2015 |
| JP | 2020-048185 | A | 3/2020 |
| WO | 2020/235401 | A1 | 11/2020 |

OTHER PUBLICATIONS

Bardow Patrick et al: "Simultaneous Optical Flow and Intensity Estimation from an Event Camera", 2016 IEEE Conference on Computer Vision and Pattern Recognition (CVPR), IEEE, Jun. 27, 2016 (Jun. 27, 2016), pp. 884-892, XP033021219.

Guillermo Gallego et al: "Event-based Vision: A Survey", arxiv.org, Cornell University Library, 201 Olin Library Cornell University Ithaca, NY 14853, Aug. 8, 2020 (Aug. 8, 2020), XP081735140.

Paredes-Valles et al: "Back to Event Basics: Self-Supervised Learning of Image Reconstruction for Event Cameras via Photometric Constancy", 2021 IEEE/CVF Conference on Computer Vision and Pattern Recognition (CVPR), [Online] Apr. 12, 2021 (Apr. 12, 2021), pp. 1-17, XP081765253.

Rebecq Henri et al: "Events-to-Video: Bringing Modern Computer Vision to Event Cameras", 2019 IEEE/CVF Conference on Computer Vision and Pattern Recognition (CVPR), IEEE, Jun. 15, 2019 (Jun. 15, 2019), pp. 3852-3861, XP033686811.

* cited by examiner

INFORMATION PROCESSING DEVICE, INFORMATION PROCESSING METHOD, AND INFORMATION PROCESSING PROGRAM FOR GENERATING, BASED ON FIRST INFORMATION, SECOND INFORMATION CORRESPONDING TO A SECOND TIME WHICH IS A TIME LATER THAN A FIRST TIME WHICH IS A TIME CORRESPONDING TO THE FIRST INFORMATION

CROSS-REFERENCE TO RELATED APPLICATIONS

The present application is based on PCT filing PCT/JP2022/012525, filed Mar. 18, 2022, which claims priority from Japanese Patent Application No. 2021-098261, filed Jun. 11, 2021, the entire contents of each are incorporated herein by reference.

FIELD

The present disclosure relates to an information processing device, an information processing method, and an information processing program.

BACKGROUND

There is a conventional technique of generating information such as an image at a time point ahead (in the future) based on information obtained until the processing time point. For example, in order to reduce a temporal difference between an actual event and a displayed image, there is provided a technique of generating first predicted image information at a second time point, which is later than a first time point, by using first image information at the first time point (for example, Patent Literature 1).

CITATION LIST

Patent Literature

Patent Literature 1: JP 2020-048185 A

Summary

Technical Problem

However, there is room for improvement in the conventional technology. For example, the conventional technology directly uses the first image information itself at the first time point to generate the first predicted image at the second time point, and there is room for improvement in terms of information used in information generation. Accordingly, efficient generation of information is desired.

In view of this, the present disclosure proposes an information processing device, an information processing method, and an information processing program capable of performing efficient generation of information.

Solution to Problem

According to the present disclosure, an information processing device includes an acquisition means that acquires first information which is part of information among information regarding a target region; and a generation means that generates, based on the first information acquired by the acquisition means, second information corresponding to a second time which is a time later than a first time which is a time corresponding to the first information.

DESCRIPTION OF EMBODIMENTS

Embodiments of the present disclosure will be described below in detail with reference to the drawings. Note that the information processing device, the information processing method, and the information processing program according to the present application are not limited by the embodiments. Moreover, in each of the following embodiments, the same parts are denoted by the same reference symbols, and a repetitive description thereof will be omitted.

The present disclosure will be described in the following order.

1. Embodiments
  1-1. First embodiment
    1-1-1. Outline of information processing
    1-1-2. Background, etc.
    1-1-3. Outline of information processing according to first embodiment
    1-1-4. Configuration of information processing device according to first embodiment
    1-1-5. Information processing procedure
  1-2. Second embodiment
    1-2-1. Outline of information processing according to second embodiment
    1-2-2. Configuration of information processing device according to second embodiment
  1-3. Third embodiment
    1-3-1. Outline of information processing according to third embodiment
  1-4. Fourth embodiment
    1-4-1. Outline of information processing according to fourth embodiment
  1-5. Fifth embodiment
    1-5-1. Outline of information processing according to fifth embodiment
  1-6. Sixth embodiment
    1-6-1. Outline of information processing according to sixth embodiment
    1-6-2. Configuration of information processing device according to sixth embodiment
  1-7. Seventh embodiment
    1-7-1. Configuration outline of information processing device according to seventh embodiment
    1-7-2. Configuration of information processing device according to seventh embodiment
  1-8. Application examples
    1-8-1. Robot
    1-8-2. Activity on virtual space
    1-8-3. Other application examples
  1-9. Example of application to mobile body
2. Others
3. Effects according to present disclosure
4. Hardware configuration
5. Other embodiments
  5-1. Eighth embodiment
  5-2. Ninth embodiment
    5-2-1. Example of miniaturization of configuration
  5-3. Tenth embodiment
  5-4. Eleventh embodiment
  5-5. Twelfth embodiment
  5-6. Thirteenth embodiment
  5-7. Fourteenth embodiment

1. EMBODIMENTS

1-1. First Embodiment

[1-1-1. Outline of Information Processing]

Figure 1:
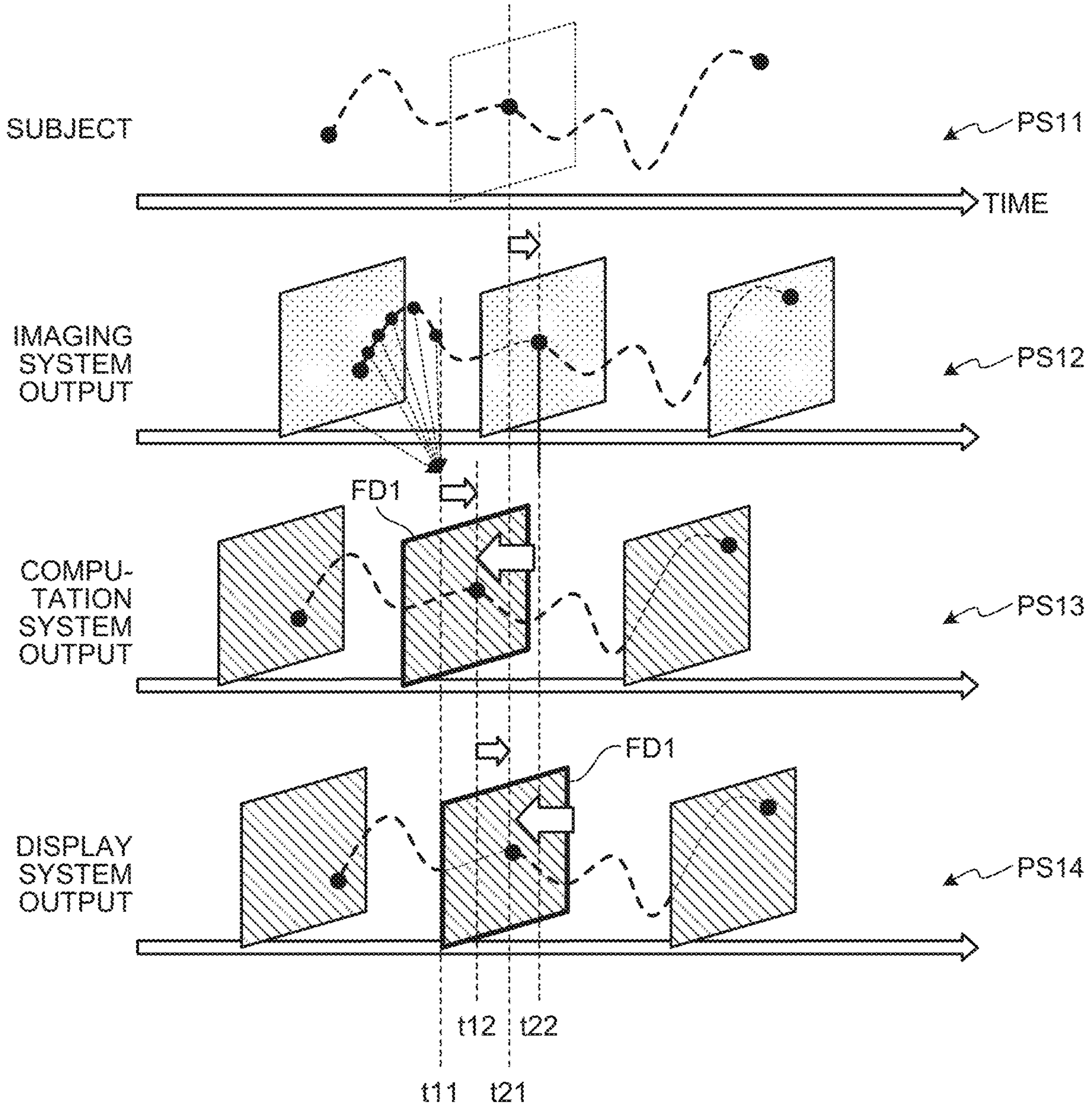
FIG. 1 is a diagram depicting an outline of information processing of the present disclosure.
Figure 2:
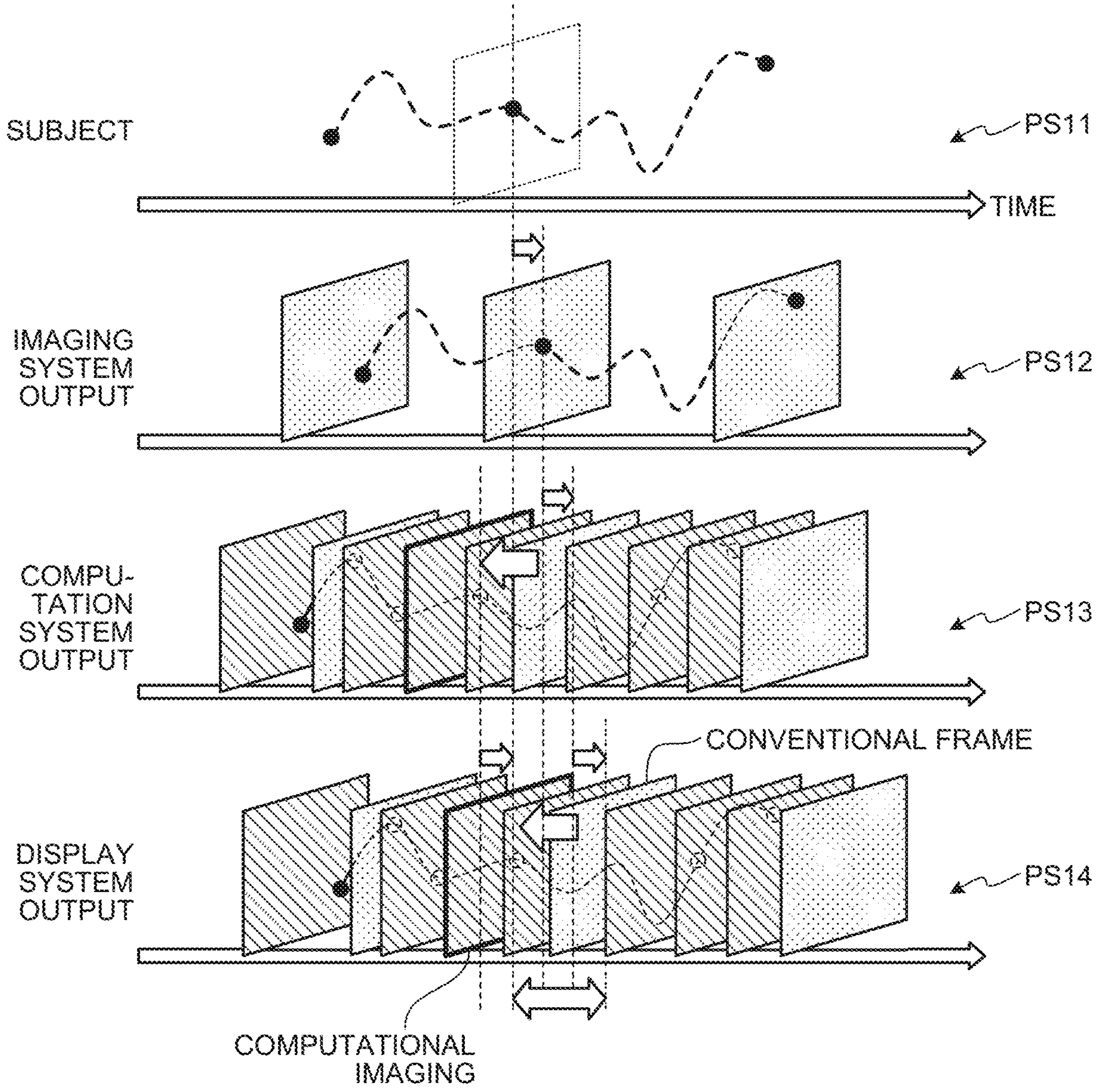
FIG. 2 is a diagram depicting an outline of information processing of the present disclosure.

First, prior to the description of each embodiment, points common to each embodiment will be described with reference to FIGS. 1 and 2. FIGS. 1 and 2 are diagrams depicting an outline of information processing of the present disclosure. Although the following will be given based on an image as an example, but information to be processed is not limited to an image, and may be various information. For example, the information to be processed is not limited to plane (two-dimensional) information like an image, and may be one-dimensional information such as acceleration or sound, or may be N-dimensional space information like a three-dimensional space. In this manner, the information to be processed is not limited to two-dimensional information such as an image, and may be information of any dimension other than two dimensions, such as one-dimensional or N-dimensional being three-dimensional or more. Note that the dimension of the information here means a dimension excluding a time axis (one-dimension corresponding to time).

Figure 21:
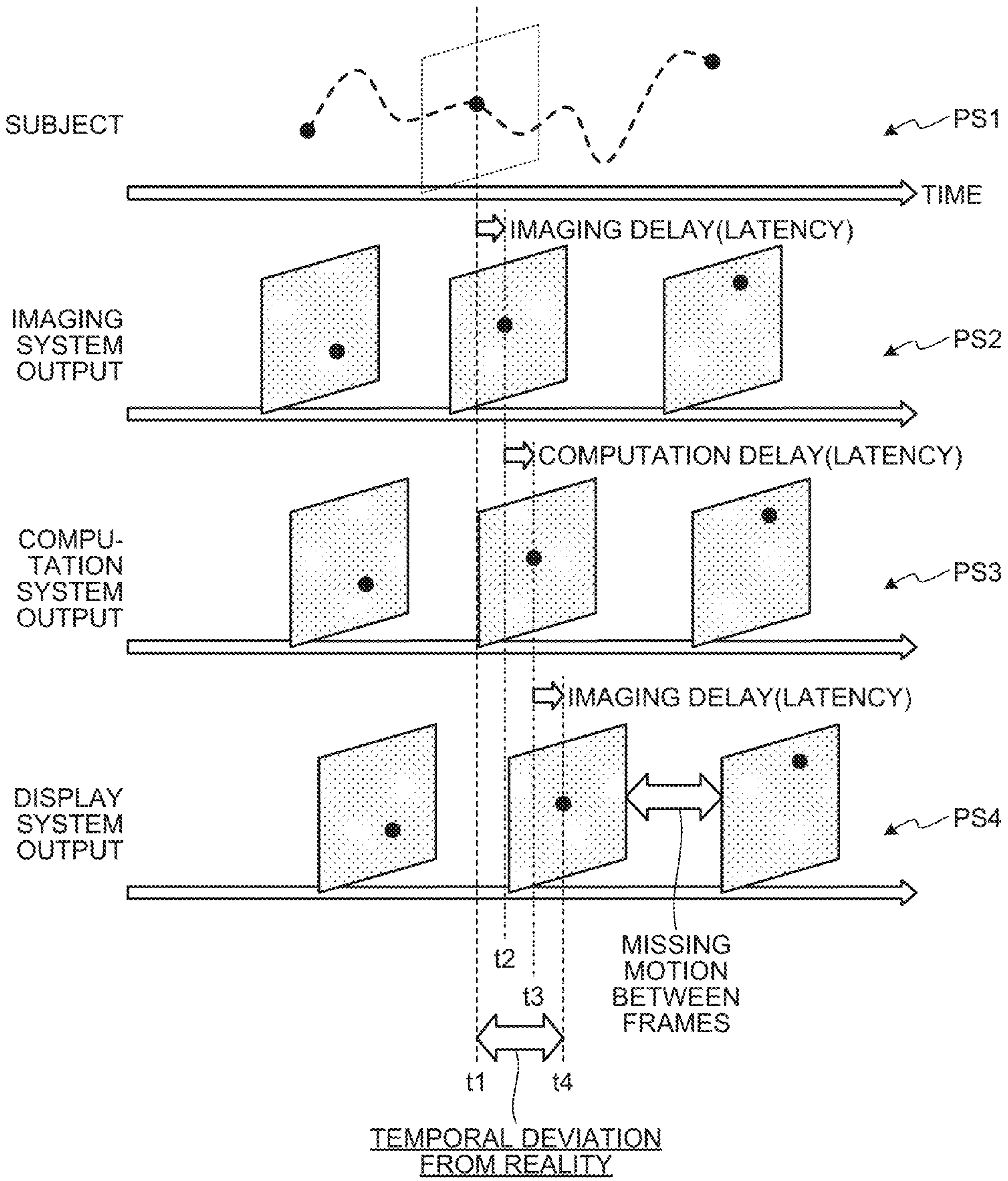
FIG. 21 is a diagram depicting an outline of information processing in a conventional technology.

Hereinafter, an outline of information processing of the present disclosure will be described with reference to FIGS. 1 and 2, together with FIG. 21 depicting an example of a conventional technology as a comparison of the present disclosure. FIG. 21 is a diagram depicting an outline of information processing in a conventional technology. First, an outline of an example depicted in FIG. 21 will be described.

FIG. 21 depicts processing of a conventional technology in a system using two-dimensional (2D) frame data. The processing example depicted in FIG. 21 includes: a first stage PS1 corresponding to a subject (real world); a second stage PS2 corresponding to an imaging system output (also simply referred to as an imaging system); a third stage PS3 corresponding to a computation system output (also simply referred to as a computation system); and a fourth stage PS4 corresponding to a display system output (also simply referred to as a display system). As depicted in FIG. 21, processing a subject (the real world) by an imaging system, a computation system, and a display system causes a delay. That is, a delay occurs by processing from the first stage PS1 of the real world to the fourth stage PS4 of display.

For example, an imaging delay (latency) occurs in the second stage PS2. In the example of FIG. 21, an imaging delay occurs in the output of the imaging system corresponding to time point t1 of the subject (the real world), and the output is performed at time point t2, which is later than time point t1. In addition, a computation delay (latency) occurs in the third stage PS3. In the example of FIG. 21, a computation delay occurs in the output of the computation system corresponding to time point t1 of the subject (the real world). The computation delay is added to the imaging delay, and the output is performed at time point t3, which is later than time point t2. In addition, a display delay (latency) occurs in the fourth stage PS4. In the example of FIG. 21, a display delay occurs in the output of the display system corresponding to time point t1 of the subject (the real world). The display delay is added to the imaging delay and the computation delay, and the output is performed at time point t4, which is later than time point t3.

In this manner, a delay (latency) occurs during a period from the imaging system to the display system, leading to an occurrence of a time lag from reality. As a result, for example, in a case where the display system is a display, a temporal deviation occurs between the timing at which information is perceived by human eyes and the real world. For example, in a case where the frame data is processed at a rate of 60 frames per second (fps), there occurs a delay corresponding to at least one frame or more. In use cases requiring quick action such as sports and motion detection, this delay (lag) can have a large influence. Furthermore, even if not, the delay is assumed to have a great influence on the usability or use comfort in the user.

In view of these, information processing of the present disclosure as depicted in FIG. 1 is executed. This point will be described below. Hereinafter, description of the points similar to the above description will be omitted as appropriate. The processing example depicted in FIG. 1 includes: a first stage PS11 corresponding to a subject (real world); a second stage PS12 corresponding to an imaging system output; a third stage PS13 corresponding to a computation system output; and a fourth stage PS14 corresponding to a display system output. In the example of FIG. 1, in the second stage PS12 of the imaging system output, an image corresponding to time point t21 is output at time point t22, which is later than time point t21. In this manner, an imaging delay (latency) also occurs in the example of FIG. 1. A dotted line depicted in the second stage PS12 represents a pattern such as trajectory of an event-based vision sensor (EVS), an optical flow, for example, and indicates additional information with high temporal resolution like several milliseconds or less, for example.

In the example depicted in FIG. 1, the stages of the computation system output or later generate images by computational imaging. For example, in the information processing of the present disclosure, an image with a negative delay (also referred to as negative latency) is generated when information is passed from the imaging system to the display system. The information processing of the present disclosure uses this operation to transmit the negative latency image when information is passed from the computation system to the display system so as to be fitted to the real world. In the example of FIG. 1, an image FD1 is generated at time point t12 in the third stage PS13 of the computation system output. Here, the image FD1 is an image corresponding to time point t21 of the subject (real world). The information processing of the present disclosure predicts and generates an image at a time point of the subject (real world) before the time point of the subject (real world). In the information processing of the present disclosure, the image FD1 is generated using information before time point t11. For example, in the information processing of the present disclosure, the image FD1 is generated using information of a portion (pixel) where the image has changed before time point t11. In this manner, in the information processing of the present disclosure, the image FD1 is generated using only information of a portion (pixel) of the image necessary for processing.

In this manner, the information processing of the present disclosure generates the image FD1 corresponding to time point t21 at time point t12 which is before time point t21 in the third stage PS13, making it possible to output the image FD1 at time point t21 in the fourth stage PS14 of the display system output. That is, the information processing of the present disclosure makes it possible to realize processing (system) in which data seems to be generated at the same timing as in the real world when observed through the display system output, and express the real-time world.

Furthermore, the real-time world as described above is realized by predicting future data using past data. For example, it is realized by acquiring information with higher density in the time direction than frame data of conventional technologies. Therefore, an imaging system with such a function may be used in the information processing of the present disclosure. This makes it possible to generate a new added value by utilizing inter-frame information that cannot be obtained with frame data in conventional technologies. For example, an example of such an imaging system includes an Event-based Vision Sensor (EVS). EVS is also referred to as a Dynamic Vision Sensor (DVS).

Here, EVS will be described. For example, EVS images a predetermined imaging range through a lens. EVS is an asynchronous image sensor in which a plurality of pixels having photoelectric conversion elements is two-dimensionally arranged and a detection circuit that detects an address event in real time is provided for each pixel. An address event is an event that occurs for each address assigned to each of the plurality of pixels arranged in a two-dimensional pattern, and corresponds to an event in which a value of a current based on a charge generated in the photoelectric conversion element or a change amount of the value exceeds a certain threshold.

The EVS detects the presence or absence of occurrence of an address event for each pixel. When having detected occurrence of an address event, the EVS reads a pixel signal from the pixel in which the address event has occurred as pixel data.

EVS executes a pixel signal read operation for the pixel in which the occurrence of the address event has been detected. Accordingly, EVS is capable of performing reading at a much higher speed than that in a synchronous image sensor in which the read operation is executed at a predetermined frame rate for all the pixels, with small data volume to be read out as one frame.

Therefore, an information processing device 100 (refer to FIG. 4) can detect the motion of a target organism more quickly by using EVS. In addition, the EVS can also achieve reduction of power consumption, together with reduction of data volume. Note that EVS is an example, and the imaging system may be any device as long as the device can output high density information in the time direction, such as EVS.

Furthermore, as depicted in FIG. 2, with the information processing of the present disclosure, an image generated by the computation system can be generated with higher time resolution compared with conventional frame data. Hereinafter, description of the points similar to the above description will be omitted as appropriate. The first stage PS11 in FIG. 2 corresponds to the first stage PS11 in FIG. 1. The second stage PS12 in FIG. 2 corresponds to the second stage PS12 in FIG. 1. The third stage PS13 in FIG. 2 corresponds to the third stage PS13 in FIG. 1. The fourth stage PS14 in FIG. 2 corresponds to the fourth stage PS14 in FIG. 1. As depicted in FIG. 2, the information processing of the present disclosure generates an image with negative latency in the third stage PS13 of the computation system output, and displays, in the fourth stage PS14 of the display system output, the image generated in the third stage PS13 at a time point corresponding to the subject (real world). In this manner, the information processing of the present disclosure makes it possible to perform real-time output and further enhance the power of expression in the real world compared with the conventional technology.

[1-1-2. Background, Etc.]

Here, situations such as background of performing the information processing of the present disclosure as described above will be described. Technologies related to virtual reality (VR) and augmented reality (AR) have been developed, together with expansions of markets of robot operation by remote control and games using AR glasses. The currently developing technologies include a study of mixed reality (MR) in which interactive elements are added in the AR space, leading to a possibility of disappearance of a border between the reality and the virtual space in the near future. One of important techniques for realizing a borderless state with no boundary between the virtual space and the real space would be real-time processing in a system or the like.

On the other hand, as depicted in FIG. 21, there is a delay time derived from the processing speed and the communication speed in conventional technologies. Therefore, in performing eye tracking and reacting or performing quick motion operation after recognizing a quick moving object in sports such as baseball and table tennis, there is a problem of difficulty to achieve real-time operation.

In view of this, information processing of the present disclosure predicts future data with respect to stream data on the time axis, making it possible to generate a new image having a higher resolution than the frame synchronization signal from the original data so as to output real-time data. That is, information processing of the present disclosure implements processing of predicting future data with respect to stream data on the time axis, generating a new image having a higher resolution than the frame synchronization signal from the original data, and outputting real-time data. The output means in the information processing of the present disclosure is not limited to the display, and may be an actuator or the like. For example, the information processing of the present disclosure makes it possible to support user reactions (reaction speed of person, delay in actuator of a robot). Furthermore, the information processing of the present disclosure makes it possible to perform real-time rendering on a moving subject by MR.

[1-1-3. Outline of Information Processing According to First Embodiment]

Figure 3:
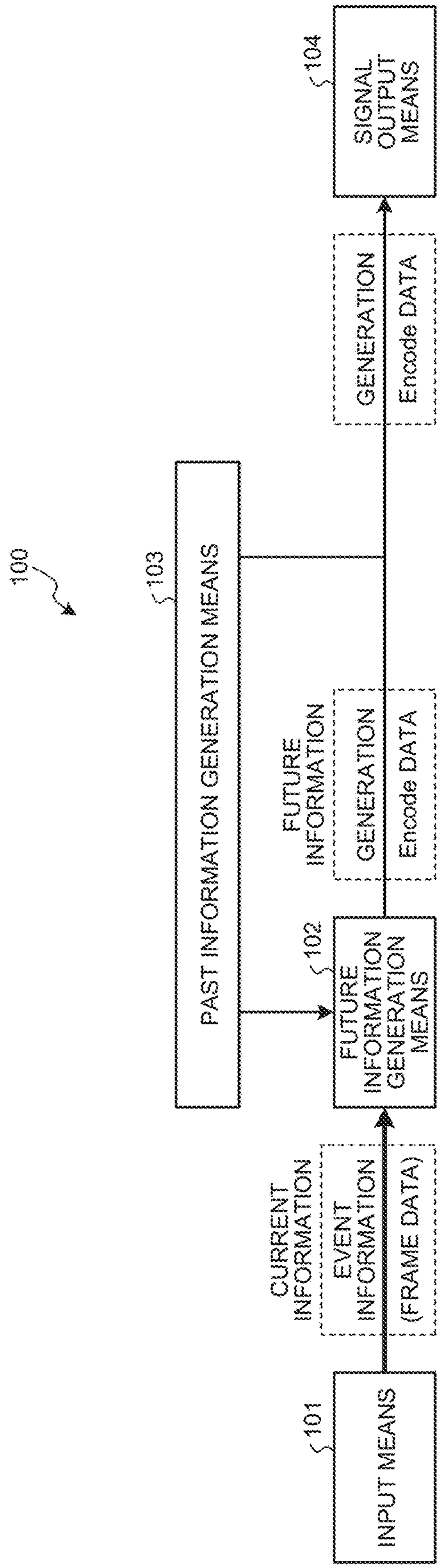
FIG. 3 is a diagram depicting an example of information processing according to a first embodiment of the present disclosure.

Hereinafter, each embodiment will be described based on the premise described above. The following exemplary embodiments are based on the information processing (the concept thereof) described in FIGS. 1 and 2. First, an information processing according to the first embodiment will be described with reference to FIG. 3. FIG. 3 is a diagram illustrating an example of information processing according to the first embodiment of the present disclosure. The information processing according to the first embodiment is implemented by the information processing device 100. Solid rectangles denoted with reference numerals in FIG. 3 indicate components of the information processing device 100, while dotted rectangles in FIG. 3 indicate information acquired or generated in information processing performed by the information processing device 100.

FIG. 3 depicts an information processing device 100 that implements information processing as the most basic concept. The information processing device 100 includes an input means 101, a future information generation means 102, a past information generation means 103, and a signal output means 104. The input means 101 of the information processing device 100 corresponds to the imaging system of the second stage PS12 in FIGS. 1 and 2. Furthermore, the future information generation means 102 of the information processing device 100 corresponds to the computation system of the third stage PS13 in FIGS. 1 and 2. In addition, the signal output means 104 of the information processing device 100 corresponds to the display system of the fourth stage PS14 in FIGS. 1 and 2. Details of the configuration of the information processing device 100 will be described with reference to FIG. 4.

In the example of FIG. 3, the input means 101 converts the real world into information indicating an event (also referred to as "event information"). For example, the input means 101 images the real world and converts the imaged real world into event information. In FIG. 3, the input means 101 captures an image of a predetermined region in the real world, and generates information (event information) indicating a portion having a change in the predetermined region in a first time, as current information. Note that the current information may include frame data. In this case, the input means 101 may convert the imaged real world into frame data, and generate the frame data from the imaged real world.

Subsequently, the input means 101 passes the current information to the future information generation means 102. Using the current information, the future information generation means 102 generates information for displaying an image of the second time later than the first time as the future information. In FIG. 3, the future information generation means 102 generates, as the future information, generated Encode data to be used for displaying the image of the second time. For example, the future information generation means 102 generates information (event information) indicating a portion predicted to have a change in the predetermined region in the second time, as the future information.

When generating the future information, the future information generation means 102 uses information provided by the past information generation means 103 (also referred to as past information). The past information generation means 103 provides, as the past information, past information that has been already processed, such as generated Encode data generated in the past, to the future information generation means 102. By recursively using the past information already processed, the future information generation means 102 can generate future information by continuous information with high time resolution.

Subsequently, the future information generation means 102 passes the future information to the signal output means 104. The signal output means 104 converts the future information into a format according to the output mode. For example, the signal output means 104 converts the format of data according to an application, such as image data or a signal for driving an actuator of a robot. In FIG. 3, the signal output means 104 converts the format of information (event information) indicating a portion predicted to have a change within a predetermined region in the second time into image data corresponding to the second time. The signal output means 104 displays an image corresponding to the second time by using information (event information) indicating a portion predicted to have a change in the predetermined region in the second time. In the example of FIG. 3, the information processing device 100 learns a trajectory of a ball or a line of sight in a ball sport or eye tracking, for example, and estimates a future motion with respect to continuous information. In addition, composite data may be generated from the original data and transmitted to a display device such as a display, which will be described below.

[1-1-4. Configuration of Information Processing Device According to First Embodiment]

Figure 4:
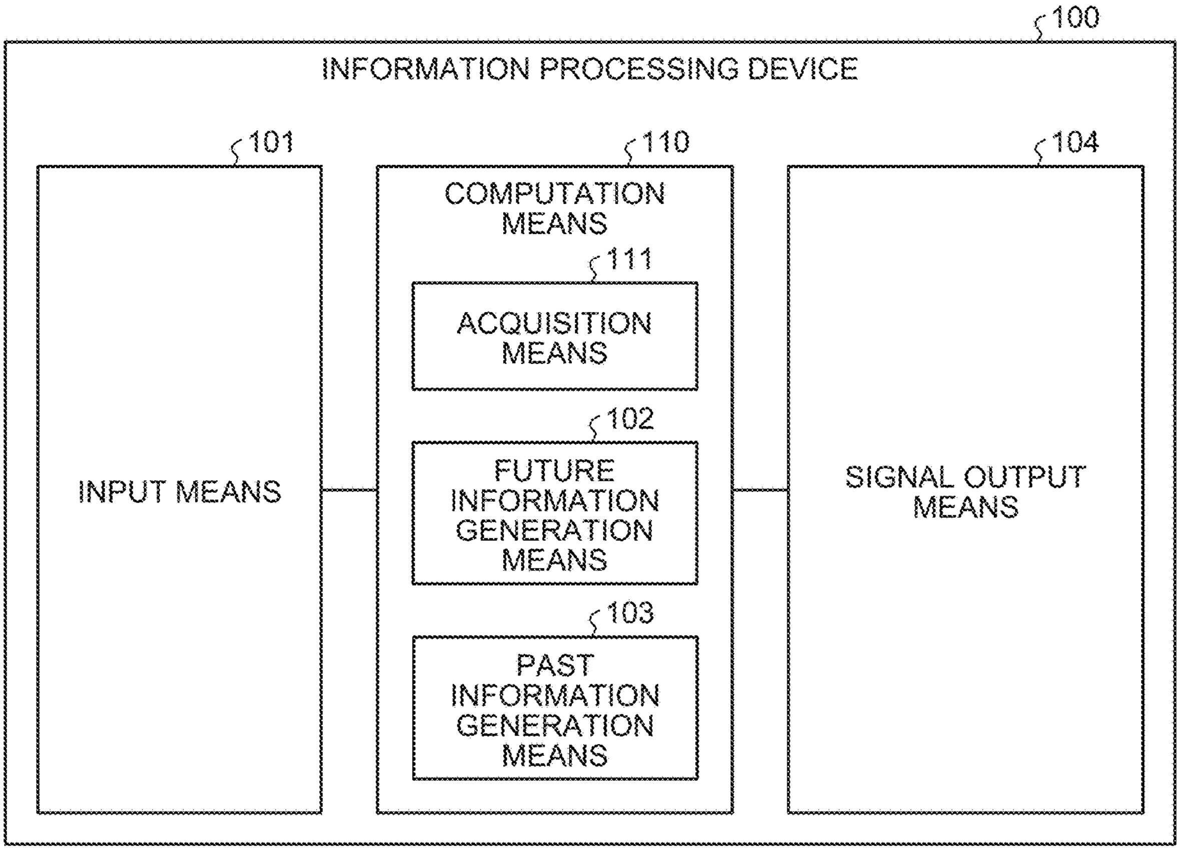
FIG. 4 is a diagram depicting a configuration example of an information processing device according to the first embodiment of the present disclosure.

Next, a configuration of the information processing device 100 which is an example of an information processing device that executes information processing according to the first embodiment will be described. FIG. 4 is a diagram depicting a configuration example of the information processing device according to the first embodiment of the present disclosure.

Note that any aspect can be adopted as a component as hardware for implementing the information processing device 100. For example, the information processing device 100 may be implemented as a module in any form such as a chip. The stacked layers may be formed with TSV, microbump, Cu—Cu connection, or the like. In a case where the information processing device 100 is realized as a chip, the chip may be stacked with three or more layers. For example, in a case where components such as the input means 101, the future information generation means 102, the signal output means 104 are mounted on a chip, the chip may be stacked with three or more layers. In addition, any configuration such as a through-silicon via (TSV), a microbump, or a Cu—Cu connection can be adopted for the stack.

As depicted in FIG. 4, the information processing device 100 includes an input means 101, a computation means 110, and a signal output means 104. Note that the information processing device 100 may include a communication section or a storage section. The communication section is implemented by a component such as a communication circuit, for example. The communication section is connected to a network in a wired or wireless channel, and transmits and receives information to and from another information processing device. The storage section is implemented by memory such as a storage circuit, for example.

The input means 101 is implemented by adopting a configuration corresponding to target information. For example, in a case where target information is an image, the input means 101 is implemented by adopting a configuration related to a device such as a sensor that detects an image. The sensor used as the input means 101 is not limited to an image sensor, and may be a sensor that detects acceleration, angular velocity, sound, or vibration.

For example, the input means 101 may be a time of flight (TOF) sensor, an image sensor, or the like, or may be a combination thereof. The input means 101 may be implemented by using EVS. In addition, the image sensor used as the input means 101 may be a fully electrified transfer method, a pulse width modulation (PWM) pixel, or an organic or inorganic photoelectric conversion film. The pixel of the image sensor may adopt any configuration. For example, the pixel may have a configuration in which one photodiode (PD) is connected to a FD (charge detector), or two or more PDs may be connected to the FD. In addition, as an example of a PTW pixel, a slope signal enters variable resistance (VR), and K_RST is reset and selected by RSEL, making it possible to generate a PTW signal according to a charge amount generated from the PD. The photoelectric conversion film of the PD may be organic or inorganic.

Furthermore, the pixel transistor (Tr) of the image sensor may be a transistor such as a Metal-Oxide-Semiconductor Field Effect Transistor (MOSFET), an Indium-Gallium-Zinc Oxider Field Effect Transistor (IGZOFET), a Tunnel Field Effect Transistor (TFET), and an organic Field Effect Transistor (organic FET). In addition, the chip on which the pixel array is arranged is not limited to the back-illuminated type, and may be a front-illuminated type. In addition, information output from the input means 101 is not limited to two-dimensional space data, and may be three-dimensional space data. Note that information indicating time (time information) is assigned to the information output by the input means 101.

The analog-to-digital converter (ADC) may be a single-slope ADC, a double integration type, a successive approximation register (SAR), a delta sigma converter, or the like. The resolution may be 1 b to 12 bits, or the like. Alternatively, it is allowable to use a method such as EVS which detects a difference between pixel signals. For example, the ADC may be an EVS type column ADC.

Figure 13:
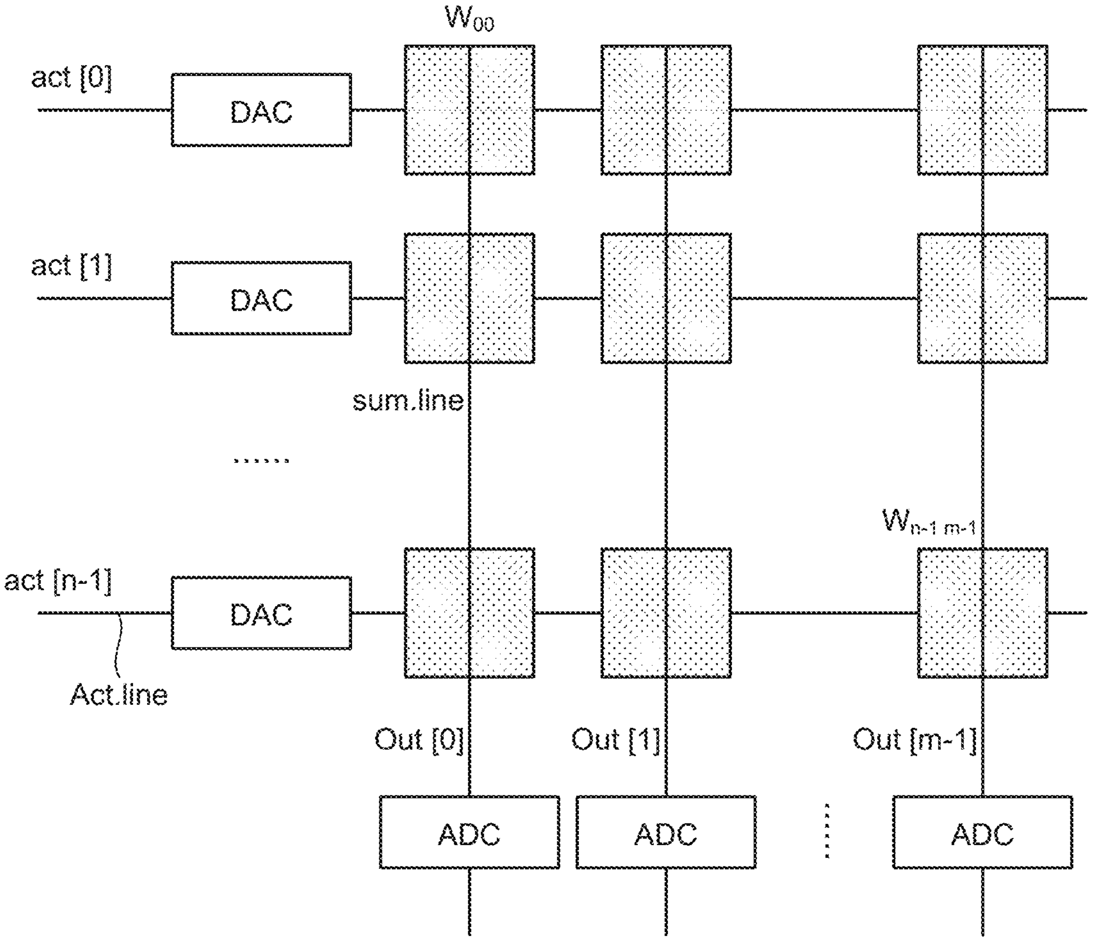
FIG. 13 is a diagram depicting an example of a configuration of CiM.

The computation means 110 is implemented by a computation device. The computation means 110 may include a digital signal processor (DSP) as a computation device, and the DSP may be included in the same chip, may be stacked, or may be provided outside the chip. The computation means 110 may include, as a computation device, a computing in memory (CiM) type device constituted with a memory array. Note that a configuration example of the CiM is depicted in FIG. 13. The computation means 110 may include devices such as static random access memory (SRAM), resistance random access memory (RRAM), and magnetoresistive random access memory (MRAM) as components.

Note that the above is merely an example, and any configuration of the computation means 110 can be adopted as long as desired processing can be implemented. For example, the computation means 110 may be implemented by an integrated circuit such as an application specific integrated circuit (ASIC) or a field programmable gate array (FPGA). The computation means 110 may be implemented by execution of a program (for example, an information processing program according to the present disclosure) stored in the information processing device 100 by various processors such as a Central Processing Unit (CPU), a Graphics Processing Unit (GPU), or a Micro Processing Unit (MPU) by using the storage section as a work area. The computation means 110 also functions as a control means.

As depicted in FIG. 4, the computation means 110 includes an acquisition means 111, a future information generation means 102, and a past information generation means 103, and implements or executes a function and an action of information processing described below. The internal configuration of the computation means 110 is not limited to the configuration depicted in FIG. 4, and may be any other configuration as long as it is a configuration that performs information processing described below.

The acquisition means 111 acquires various types of information. The acquisition means 111 acquires information from the input means 101. The acquisition means 111 acquires first information, which is part of information regarding a target region. The acquisition means 111 acquires the first information, which is part of the information regarding the target region detected by the sensor. The acquisition means 111 acquires the first information, which is information regarding a portion necessary for processing by the future information generation means 102 among the information regarding the target region. The acquisition means 111 acquires the first information, which is information regarding a portion including a change in the first time among the information regarding the target region.

The acquisition means 111 acquires the first information, which is sparse with respect to the information regarding the target region. The acquisition means 111 acquires the first information sparsely from the target region. The acquisition means 111 acquires the first information corresponding to a plurality of portions discretely located in the target region. The acquisition means 111 acquires the first information corresponding to a portion of a predetermined ratio or less in the target region. For example, the acquisition means 111 acquires the first information corresponding to a half (50%) or less of the target region. The predetermined ratio may be appropriately set. For example, the acquisition means 111 acquires the first information corresponding to a portion of a predetermined ratio or less according to the application. In a case where the information processing device 100 is installed on an automobile and images and recognizes a traffic light, the acquisition means 111 acquires the first information corresponding to 30% or less of the image.

The acquisition means 111 acquires the first information corresponding to a part of the information regarding the target region which is an image. The acquisition means 111 acquires first information corresponding to a pixel having a change in the image.

The future information generation means 102 executes processing of generating future information. Based on the first information acquired by the acquisition means 111, the future information generation means 102 generates second information corresponding to the second time, which is later than the first time being the time corresponding to the first information. Based on the first information, the future information generation means 102 generates the second information predicted to be detected by the sensor in the second time.

The future information generation means 102 generates second information which is encoded data corresponding to the second time. The future information generation means 102 generates the second information based on the first information and the third information corresponding to the third time including time information earlier than the first time.

The future information generation means 102 generates the second information by using the third information generated before the generation of the second information. The future information generation means 102 generates the second information corresponding to the image at the second time based on the first information. The future information generation means 102 generates the second information corresponding to the image at the second time based on the first information.

Inference time for generating future information by the future information generation means 102 is to be equal to or shorter than the delay of the input means 101 and the delay of the signal output means 104 (also referred to as "reference time"). The future information generation means 102 generates future information in a time equal to or less than the delay time of the input means 101 and the delay time of the signal output means 104. The future information generation means 102 may use a prediction model that uses information regarding a pixel having a change as an input and outputs information indicating a pixel estimated to have a change thereafter. The future information generation means 102 may use a prediction model that uses information regarding a pixel having a change in the first time as an input and outputs information indicating a pixel estimated to have a change in the second time. For example, the future information generation means 102 may generate the future information using a prediction model trained so that the time from the input to the output is less than the reference time.

The past information generation means 103 executes processing of generating past information. The past information generation means 103 generates past information based on the various types of information acquired by the acquisition means 111.

The signal output means 104 executes various types of processing related to output using the information generated by the future information generation means 102. The signal output means 104 outputs an image using the information generated by the future information generation means 102. In this case, the signal output means 104 is a display, AR glasses, a retinal scan display, or the like. For example, the signal output means 104 has a function of a display device. The signal output means 104 is not limited to the above, and may be any output device according to an output mode, such as an actuator of a robot. That is, the signal output means 104 can adopt any configuration as long as it has a function of converting data received from the future information generation means 102 or the like into some form and outputting the converted data.

[1-1-5. Information Processing Procedure]

Figure 5:
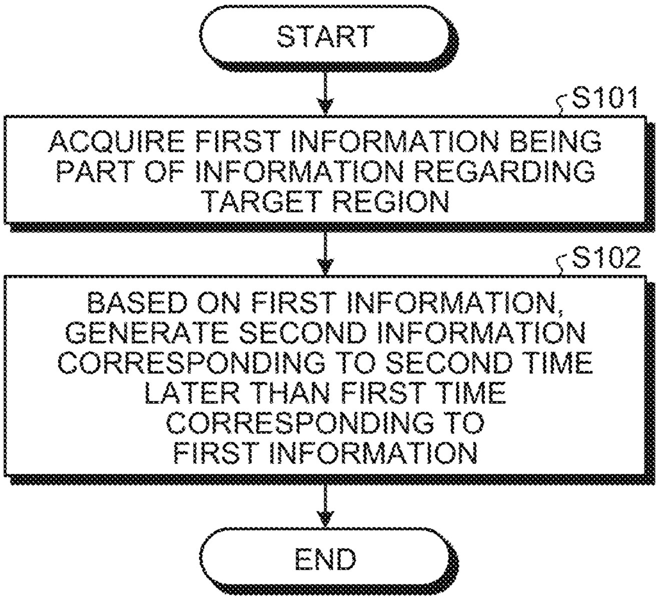
FIG. 5 is a flowchart depicting a processing procedure of an information processing device.

Next, a procedure of various types of information processing will be described with reference to FIG. 5. A flow of processing related to the information processing device will be described with reference to FIG. 5. FIG. 5 is a flowchart depicting a processing procedure of the information processing device. For example, the information processing depicted in the flowchart of FIG. 5 is executed by the information processing device 100.

As depicted in FIG. 5, the information processing device 100 acquires first information, which is part of information regarding the target region (step S101). Subsequently, based on the first information, the information processing device 100 generates second information corresponding to the second time being the time later than the first time which is the time corresponding to the first information (step S102).

1-2. Second Embodiment

Next, a second embodiment will be described with reference to FIGS. 6 and 7. First, an outline of information processing according to the second embodiment will be described with reference to FIG. 6.

[1-2-1. Outline of Information Processing According to Second Embodiment]

Figure 6:
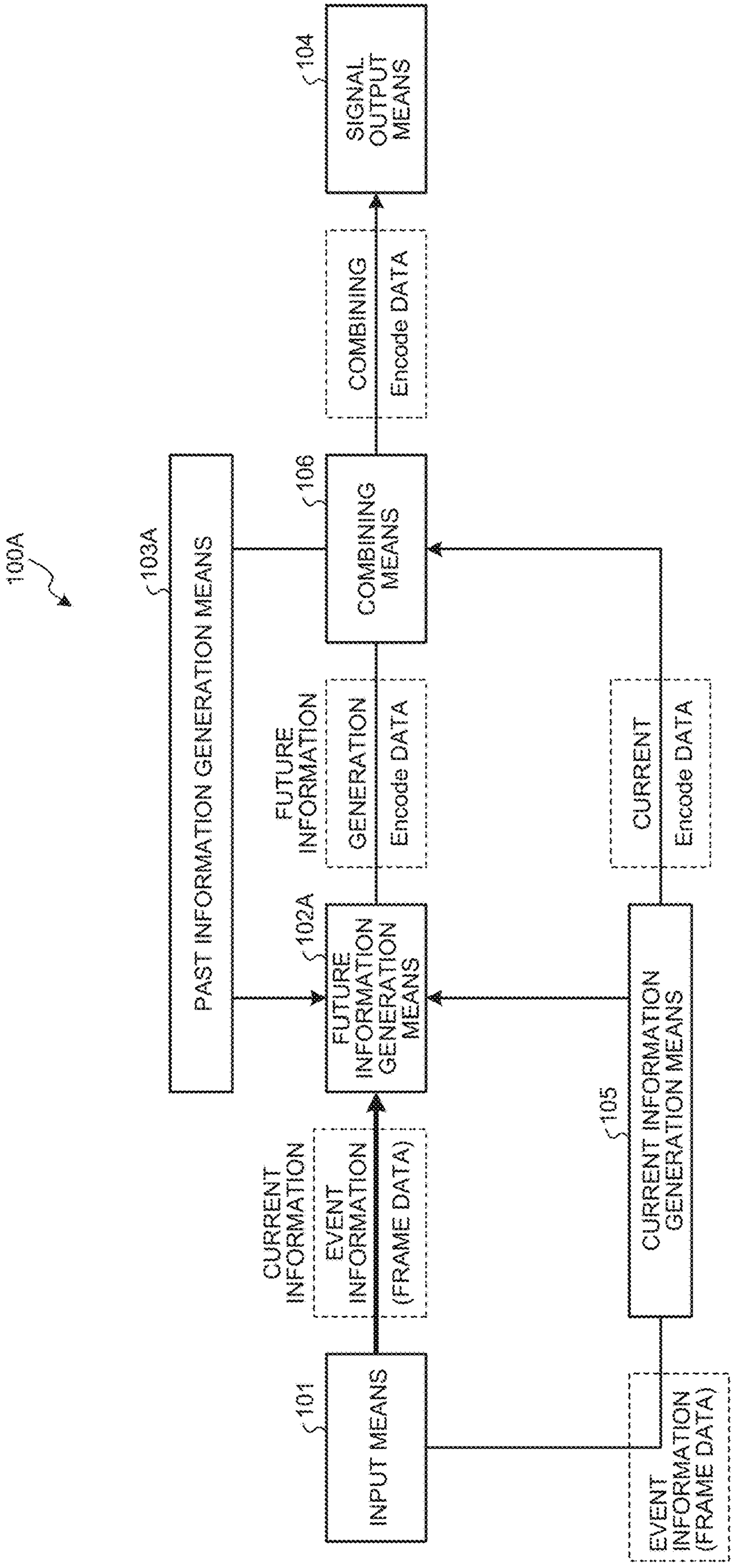
FIG. 6 is a diagram depicting an example of information processing according to a second embodiment of the present disclosure.
Figure 7:
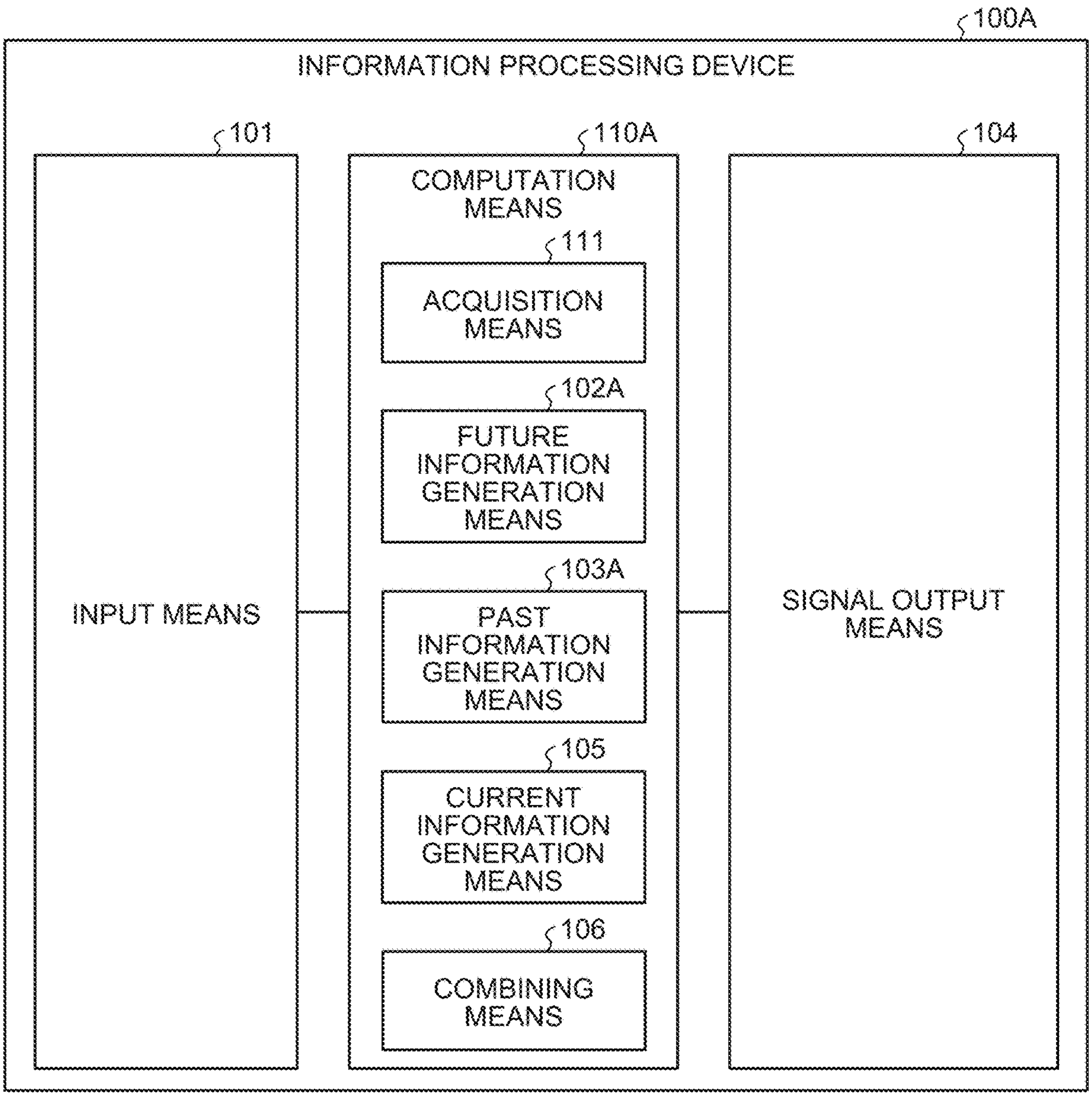
FIG. 7 is a diagram depicting a configuration example of an information processing device according to the second embodiment of the present disclosure.

FIG. 6 is a diagram depicting an example of information processing according to a second embodiment of the present disclosure. An information processing device 100A depicted in FIG. 6 is a derivative form of the information processing device 100 depicted in FIG. 1, and includes a current information generation means 105 and a combining means 106 in addition to the information processing device 100.

Hereinafter, a configuration corresponding to the configuration in the first embodiment will be described with "A" added to the end of the reference numeral, and points different from the first embodiment will be described below. Configurations similar to those of the first embodiment are denoted by the same reference numerals as those of the first embodiment, and description thereof will be omitted as appropriate. That is, in the second embodiment, "*" is replaced with "* A" for the configuration similar to the configuration in the first embodiment. For example, a future information generation means 102A in the second embodiment has a configuration similar to the future information generation means 102 in the first embodiment, and the description other than their difference will be appropriately omitted.

In FIG. 6, the input means 101 passes current information to the current information generation means 105. Using the current information, the current information generation means 105 generates information to be combined with the future information generated by the future information generation means 102A (combining-oriented current information). In FIG. 6, the current information generation means 105 generates current Encode data corresponding to the image of the first time, as combining-oriented current information. For example, the current information generation means 105 generates current Encode data indicating information (event information) indicating a portion having a change in the predetermined region in the first time. The current information generation means 105 passes the generated combining-oriented current information to the combining means 106.

When generating the future information, the future information generation means 102A uses information (also referred to as past information) provided by a past information generation means 103A. The past information generation means 103A provides, as the past information, past information that has been already processed, such as combined Encode data generated by the combining means 106 in the past, for example, to the future information generation means 102A. By recursively using the past information already processed, the future information generation means 102A can generate future information by continuous information with high time resolution.

In this manner, in the information processing device 100A, the future information generation means 102A can detect a difference between the real world and the generation information by adding current information when generating the future information. With this operation, the information processing device 100A can correct parameters used for computation in real time at a constant timing.

Subsequently, the future information generation means 102A passes the future information to the combining means 106. The combining means 106 executes combining processing of combining data output from the future information generation means 102A with data output from the current information generation means 105.

The combining means 106 uses the future information and the combining-oriented current information to generate, as the combined information, information for displaying an image of the second time, which is later than the first time. In FIG. 6, by combining processing of combining future information with combining-oriented current information, the combining means 106 generates combined Encode data used to display the image of the second time as combined information. The combining means 106 may generate the combined information by adding up the future information and the combining-oriented current information. Furthermore, the combining means 106 may generate the combined information by weighting and adding up each piece of information of the future information and the combining-oriented current information. For example, the combining means 106 generates information (event information) indicating a portion predicted to have a change in the predetermined region in the second time, as the combined information.

Subsequently, the combining means 106 passes the combined information to the signal output means 104. The signal output means 104 converts the combined information into a format according to the output mode. For example, the signal output means 104 displays an image corresponding to the second time by using information (event information) indicating a portion predicted to have a change in the predetermined region in the second time.

[1-2-2. Configuration of Information Processing Device According to Second Embodiment]

Next, a configuration of an information processing device according to a second embodiment will be described. FIG. 7 is a diagram depicting a configuration example of the information processing device according to the second embodiment of the present disclosure. As depicted in FIG. 7, the information processing device 100A includes an input means 101, a computation means 110A, and a signal output means 104.

Similarly to the computation means 110, the computation means 110A is implemented by a device such as a computation device or a processor. As depicted in FIG. 7, the computation means 110A includes an acquisition means 111, a future information generation means 102A, a past information generation means 103A, a current information generation means 105, and a combining means 106, and implements or executes a function and an action of information processing described below. The internal configuration of the computation means 110A is not limited to the configuration depicted in FIG. 7, and may be any other configuration as long as it is a configuration that performs information processing described below.

The current information generation means 105 executes processing of generating current information. Using the first information, the current information generation means 105 generates fourth information to be used for combining with the second information. The current information generation means 105 generates fourth information, which is encoded data corresponding to the first time.

The combining means 106 executes processing of combining information. The combining means 106 combines the second information with other information to generate combined information used for output. The combining means 106 combines the second information with the fourth information to generate combined information.

1-3. Third Embodiment

Next, a third embodiment will be described with reference to FIG. 8.

[1-3-1. Outline of Information Processing According to Third Embodiment]

Figure 8:
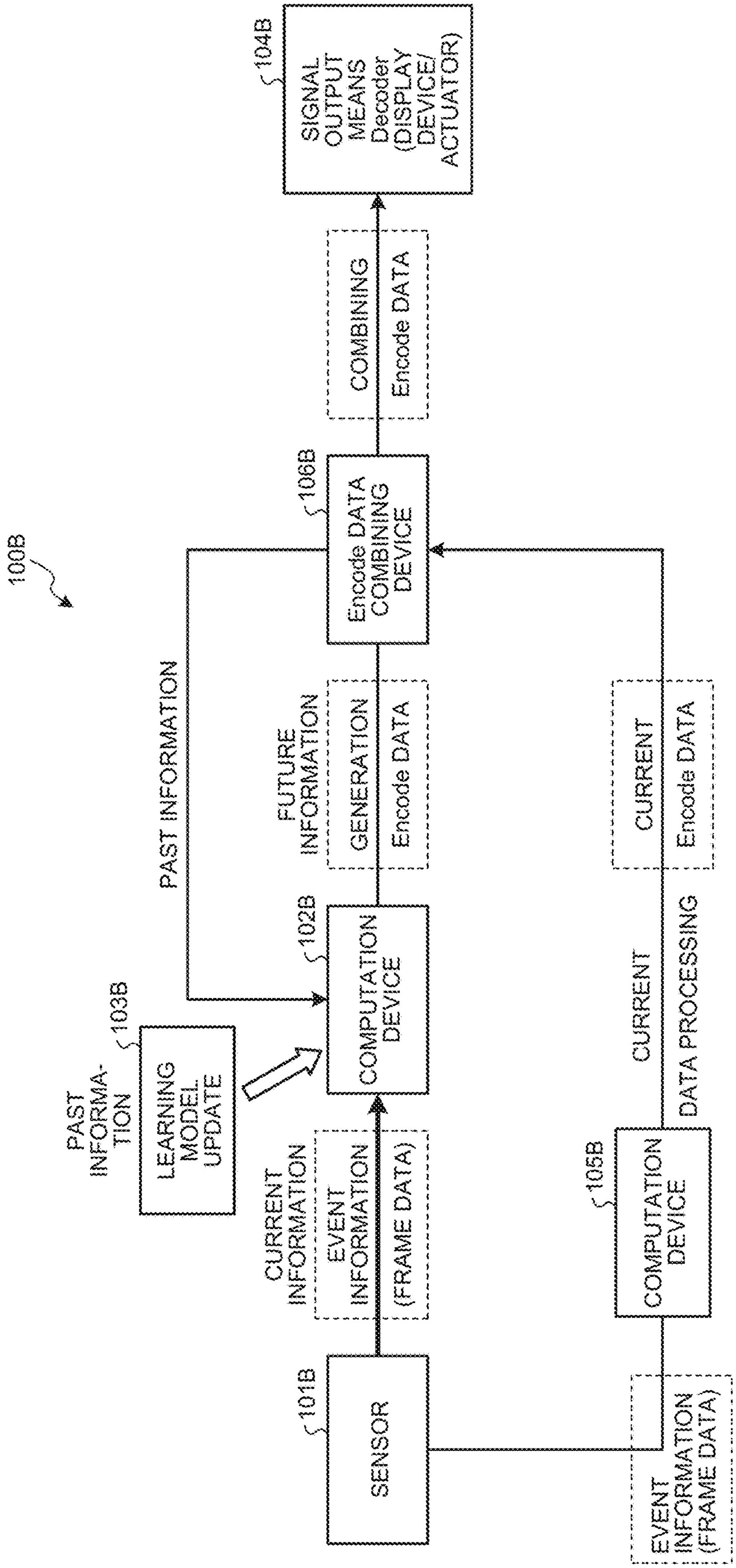
FIG. 8 is a diagram depicting an example of information processing according to a third embodiment of the present disclosure.

FIG. 8 is a diagram depicting an example of information processing according to the third embodiment of the present disclosure. Note that, in the third embodiment, the past information generation means 103A of the second embodiment is implemented as a learning model 103B, with the hardware configuration of other configurations implemented as well.

Hereinafter, the configuration corresponding to the configuration in the second embodiment is denoted by "B" attached to the end of the reference numeral. In the third embodiment, the configuration corresponding to the second embodiment is denoted by "* B" instead of the reference numeral "*" or "*A" in the second embodiment, and the description similar to the point described above is appropriately omitted. For example, a sensor 101**B in the third embodiment is a specific example of the input means 101 in the second embodiment, and the input means 101 is implemented by the sensor 101B.

The past information generation means in an information processing device 100B includes a learning model 103B created using past information in addition to a function of recursively using data converted into past information among the data generated by a computation device 102B corresponding to the future information generation means 102A. In this manner, the information processing device 100B uses the learning model 103B trained using past information. The learning model 103B is implemented as a computation parameter of the computation device 102B for generating future information. In the information processing device 100B, the computation device 102B, which is the future information generation means, generates future information, which is the second information, by using the learning model 103B updated by using the past information, which is the third information. The learning model 103B may be any information as long as it is a model used to generate future information. For example, the learning model 103B may be a prediction model that uses information regarding a pixel having a change as an input and outputs information indicating a pixel estimated to have a change thereafter.

The sensor 101B depicted in FIG. 8 is an implementation example of the input means 101. Furthermore, the computation device 102B is an implementation example of the future information generation means 102 and 102A. The future information generation means 102 and 102A may be a multiply-accumulator or the like.

In addition, the learning model 103B is an implementation example of the past information generation means 103 and 103A. The past information generation means 103 and 103A may be a multiply-accumulator, a learning model, or the like. In addition, a decoder 104B which is a display device or an actuator is an implementation example of the signal output means 104. Furthermore, a computation device 105B is an implementation example of the current information generation means 105. Furthermore, an Encode data combining device 106B corresponds to the combining means 106, and the Encode data combining device 106B may be implemented by any computation device, a combining circuit, or the like.

1-4. Fourth Embodiment

Next, a fourth embodiment will be described with reference to FIG. 9.

[1-4-1. Outline of Information Processing According to Fourth Embodiment]

Figure 9:
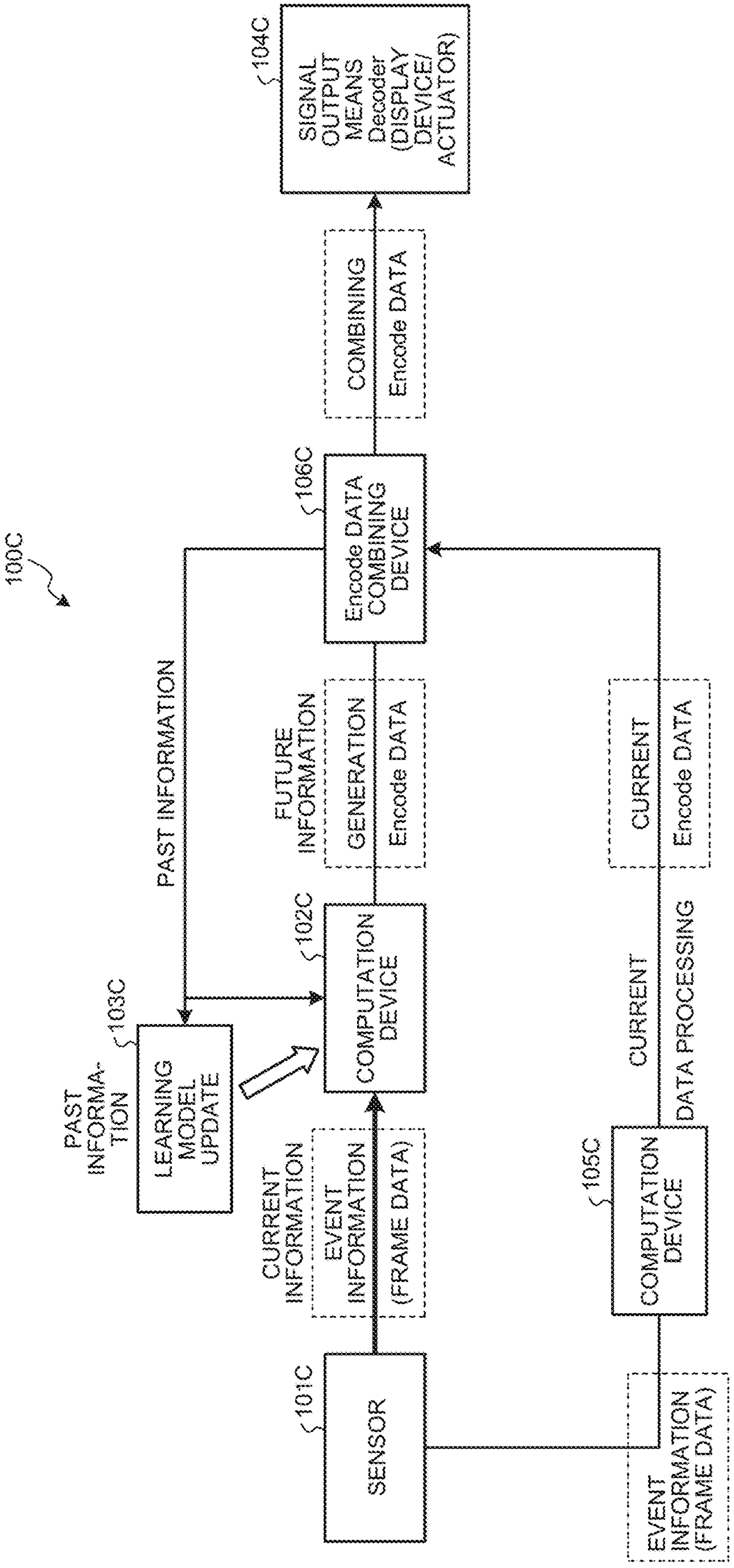
FIG. 9 is a diagram depicting an example of information processing according to a fourth embodiment of the present disclosure.

FIG. 9 is a diagram depicting an example of information processing according to the fourth embodiment of the present disclosure. Hereinafter, the configuration corresponding to the configuration in the third embodiment is denoted by "B" attached to the end of the reference numeral. In the fourth embodiment, the configuration corresponding to the third embodiment is denoted by "* C" instead of the reference numeral "*" or "*** B" in the third embodiment, and the description similar to the point described above is appropriately omitted.

An information processing device 100C updates a learning model 103C in real time with past information. The information processing device 100C updates the computation parameter of the learning model 103B using the past information. For example, every time the future information is generated, the information processing device 100C may perform feedback of generated future information as past information and may update the computation parameter of the learning model 103B. For example, the information processing device 100C may update the computation parameter of the learning model 103B using the past information and the ground truth information corresponding to information of the real world detected by the sensor at the time (time point) corresponding to the past information. In this case, the information processing device 100C updates the computation parameter of the learning model 103B such that the past information approaches the ground truth information. In this manner, the information processing device 100C can update the learning model in real time with the past information, leading to enhancement of computation accuracy. The above description is merely an example. Not merely every timing of generating the future information, the information processing device 100C may perform feedback of generated future information at a predetermined timing as past information and may update the computation parameter of the learning model 103B. For example, in a case where the number of times of generation of the future information reaches a predetermined number of times, the information processing device 100C may perform feedback of the future information generated so far as the past information, and may update the computation parameter of the learning model 103B.

1-5. Fifth Embodiment

Next, a fifth embodiment will be described with reference to FIG. 10.

[1-5-1. Outline of Information Processing According to Fifth Embodiment]

Figure 10:
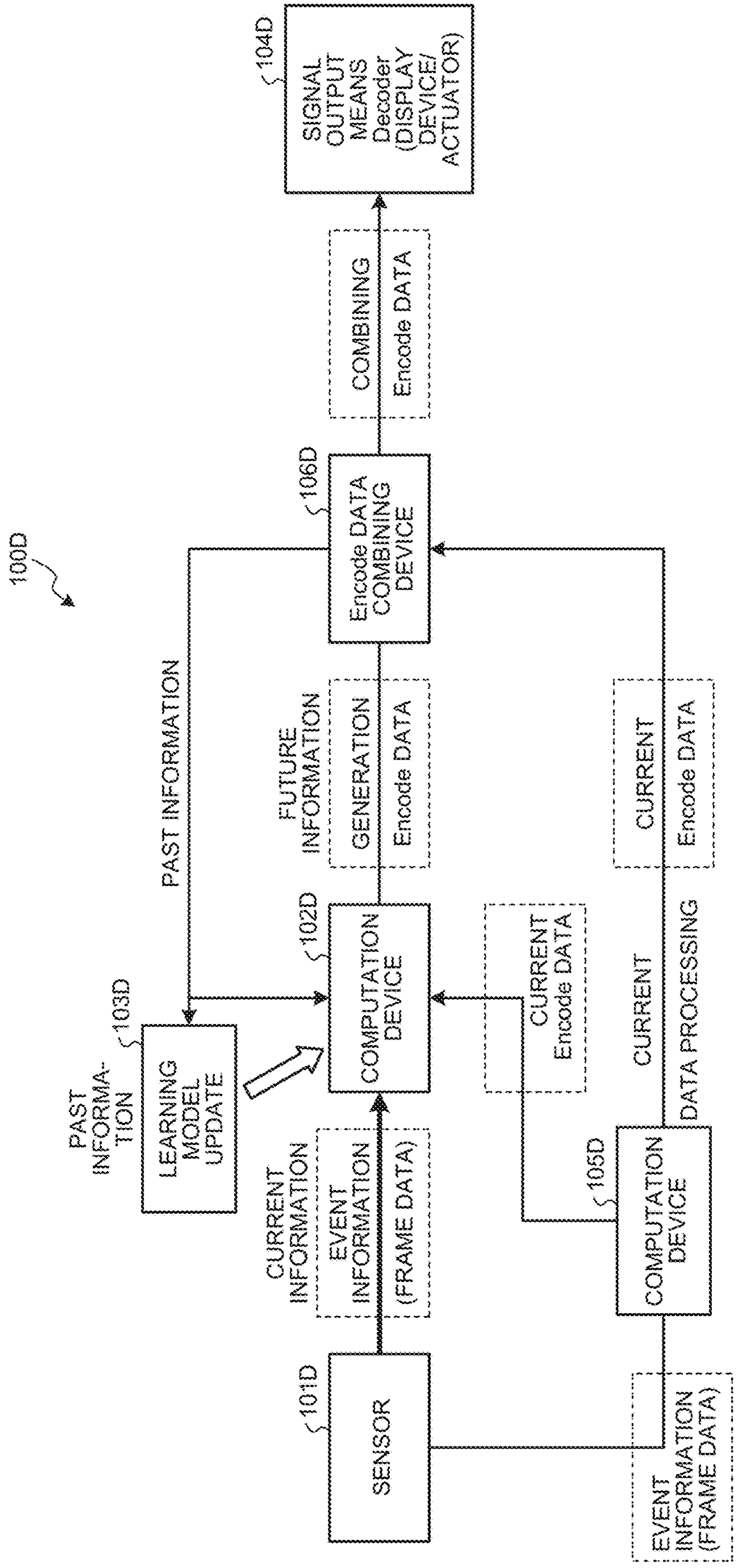
FIG. 10 is a diagram depicting an example of information processing according to a fifth embodiment of the present disclosure.

FIG. 10 is a diagram depicting an example of information processing according to the fifth embodiment of the present disclosure. Hereinafter, the configuration corresponding to the configuration in the fourth embodiment is denoted by "B" attached to the end of the reference numeral. In the fifth embodiment, the configuration corresponding to the fourth embodiment is denoted by "* D" instead of the reference numeral "*" or "*** C" in the fourth embodiment, and the description similar to the point described above is appropriately omitted.

In an information processing device 100D, computation result information (current Encode data) obtained by a computation device 105D being the current information generation means is directly passed to a computation device 102D being the future information generation means. The computation device 102D generates the future information using the current information and the current Encode data. With this operation, the information processing device 100D can increase the computation accuracy. The computation device 102D may generate future information by using a prediction model that uses the current information and the current Encode data as input and outputs information indicating a pixel estimated to have a change thereafter. Note that the above is merely an example, and the computation device 102D may generate the future information by any type of processing as long as the current information and the current Encode data are used.

1-6. Sixth Embodiment

Next, a sixth embodiment will be described with reference to FIGS. 11 and 12. First, an outline of information processing according to the sixth embodiment will be described with reference to FIG. 11.

[1-6-1. Outline of Information Processing According to Sixth Embodiment]

Figure 11:
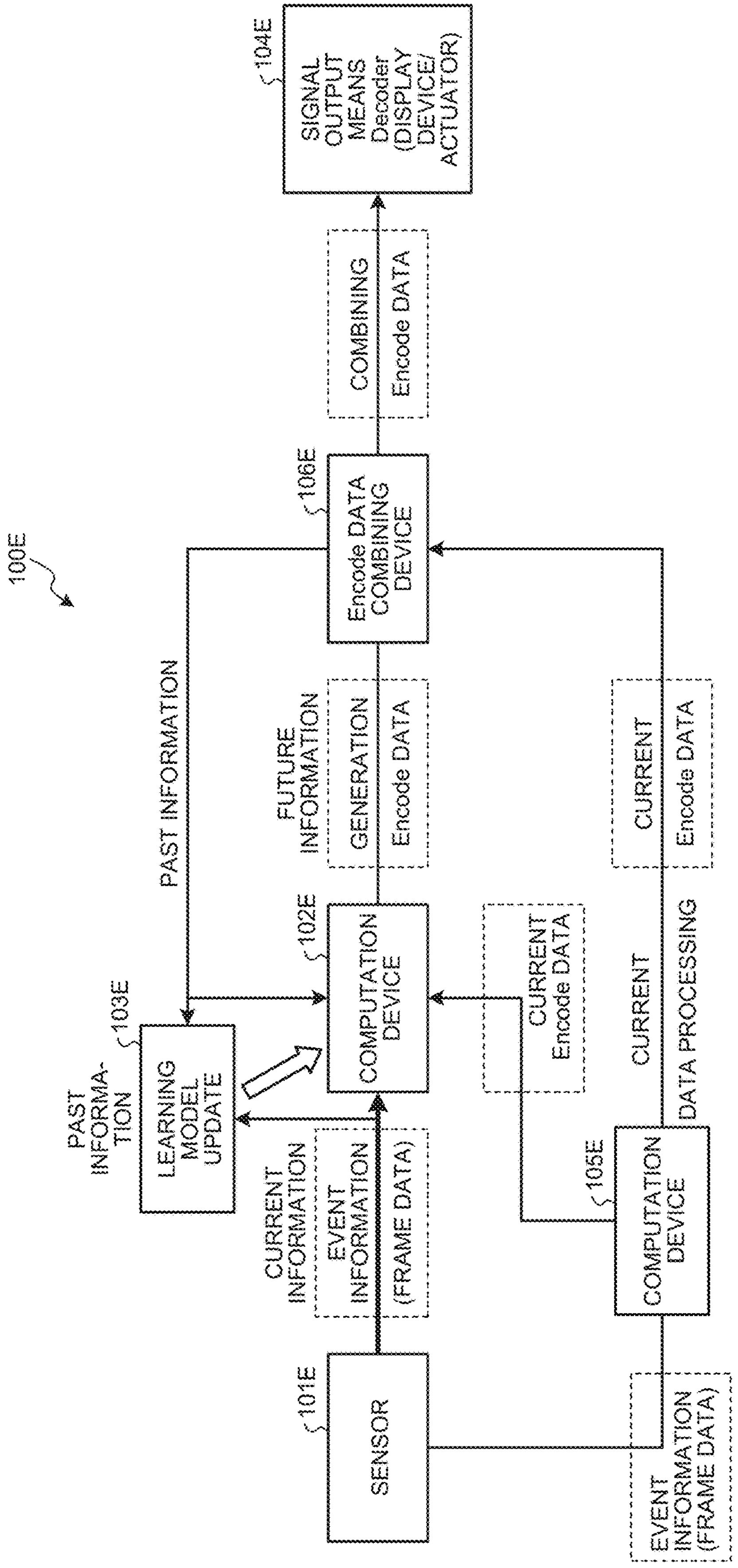
FIG. 11 is a diagram depicting an example of information processing according to a sixth embodiment of the present disclosure.

FIG. 11 is a diagram depicting an example of information processing according to the sixth embodiment of the present disclosure. Hereinafter, the configuration corresponding to the configuration in the fifth embodiment is denoted by "B" attached to the end of the reference numeral. In the sixth embodiment, the configuration corresponding to the fifth embodiment is denoted by "* E" instead of the reference numeral "*" or "*** D" in the fifth embodiment, and the description similar to the point described above is appropriately omitted.

In an information processing device 100E, data (current information) from a sensor 101E which is an input means, that is, the data before subjected to computation by a computation circuit 102E being the future information generation means, is directly used for updating a learning model 103E. The information processing device 100E updates the computation parameter of the learning model 103E using the current information. For example, the information processing device 100E may update the computation parameter of the learning model 103B using the current information and the past information of the time (time point) corresponding to the current information. For example, the information processing device 100E may update the computation parameter of the learning model 103B using the ground truth information based on the current information and using the past information. In this case, the information processing device 100E updates the computation parameter of the learning model 103B such that the past information approaches the ground truth information. In the information processing device 100E, the computation circuit 102E, which is the future information generation means, generates future information, which is the second information, by using the learning model 103E updated by using the current information, which is the first information. In this manner, the information processing device 100E can update the learning model in real time with the current information, leading to enhancement of computation accuracy. That is, the information processing device 100E can perform real-time generation of the learning model 103E capable of further improving the computation accuracy.

It is possible to adopt any combination of the elements of the first to sixth embodiments. For example, any one of the elements, a plurality of elements, or all of the elements of the second to sixth embodiments described above may be added to the first embodiment.

[1-6-2. Configuration of Information Processing Device According to Sixth Embodiment]

Here, a specific example of each configuration of an information processing device 100E depicted in FIG. 11 will be described with reference to FIG. 12. FIG. 12 is a diagram depicting a configuration example of the information processing device according to a sixth embodiment of the present disclosure.

The sensor 101E, which is an input means, can be implemented by adopting various sensors such as a CMOS image sensor (CIS), an EVS, a TOF, an inertial measurement unit (IMU), and a microphone. Note that the sensor includes a reading circuit and a control circuit.

Furthermore, the computation circuit 102E, which is the future information generation means, can be implemented by adopting a computation circuit such as a digital circuit, an analog circuit, or CiM. For example, CiM has a configuration as depicted in FIG. 13. FIG. 13 is a diagram depicting an example of a configuration of CiM. FIG. 13 is a conceptual diagram of CiM. An ADC in FIG. 13 is a converter that converts an analog signal into a digital value, and a digital-to-analog converter (DAC) in FIG. 13 is a converter that converts a digital value into an analog signal. For example, a rectangle through which the line from the ADC or the DAC passes each indicates an element (cell) of the memory array.

For example, the CiM may be a multiply-accumulator that arranges assumable variable resistance elements such as RRAM on a crossbar array so as to implement analog multiply-accumulation. For example, the CiM may be a multiply-accumulator that implements analog multiply-accumulation with multi-value memory actualized using phase-change memory (PCM), arranged on a crossbar array. For example, the CiM may use magnetic memory (MRAM or the like) instead of the RRAM or the PCM. For example, the CiM may be a device having a configuration in which a FeFET and a memory cell having a high resistance element on its drain side, are arranged on a crossbar array.

For example, the CiM may be a multiply-accumulator having both digital and analog configuration, which employs a method in which the multiplication is performed by an XNOR circuit using SRAM, the result is charged into the capacitor, and the result of the multiplication of each cell is accumulated. For example, the CiM may be a method of accessing and reading a plurality of desired FETs using the 3D NAND so as to implement the multiple-accumulation by accumulating the readout current. For example, the CiM may be implemented by a multiply-accumulator in which NOR Flash cells are arranged on an array. For example, the CiM may be implemented by a multiply-accumulator in which charge trapping transistors (CTTs) are arranged on an array. Note that the above is merely an example, and the CiM may be implemented by any configuration.

Furthermore, the learning model 103E, which is the past information generation means, can by implemented by adopting a digital circuit, an analog circuit, or the like. For example, the learning model 103E may use a signal processing circuit or the like that performs addition, division, or multiplication for learning model update on a small scale without performing complicated computations.

In addition, a decoder 104E, which is a signal output means, can be implemented by adopting a display, a head-mounted display (HMD), or the like. Furthermore, a computation device 105E, which is the current information generation means, can be implemented by adopting a computation circuit such as a digital circuit, an analog circuit, or CiM. Note that the computation circuit includes a reading circuit and a control circuit.

In addition, an Encode data combining device 106E, which is a combining means, can be implemented by adopting a digital circuit, an analog circuit, or the like. Note that the Encode data combining device 106E may use a signal processing circuit or the like that performs addition, division, or multiplication of data on a small scale without performing complicated computations.

Figure 12:
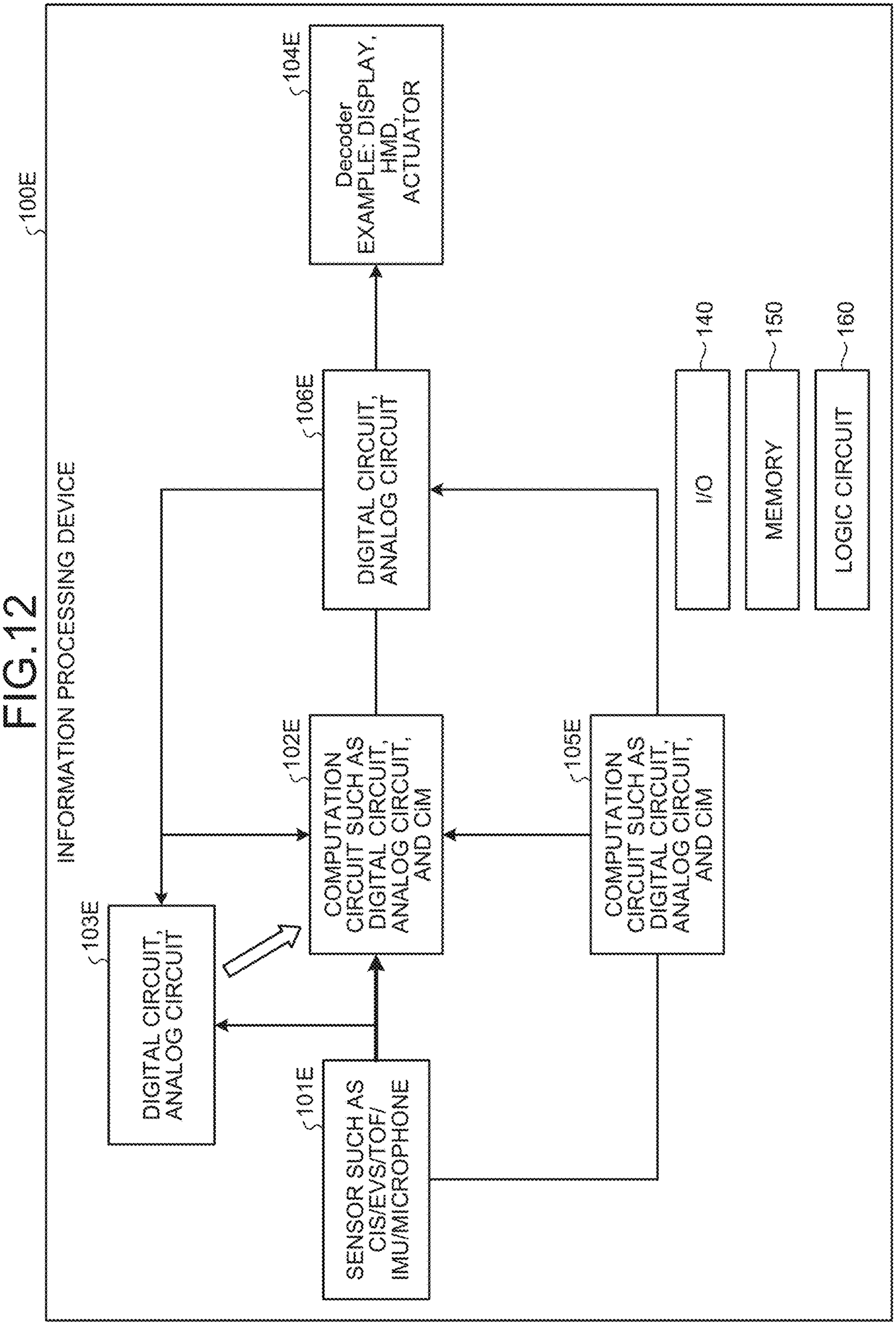
FIG. 12 is a diagram depicting a configuration example of an information processing device according to the sixth embodiment of the present disclosure.

Furthermore, in FIG. 12, although not depicted by connecting lines, the information processing device 100E includes an I/O 140, memory 150, and a logic circuit 160 shared by individual components. For example, the I/O 140 is an input/output unit for individually accessing a computation device, a sensor, and a display section. For example, the memory 150 is used to store computation results and data. For example, the logic circuit 160 is a circuit used for clocking. Note that the information processing device 100 to 100D may similarly include the I/O 140, the memory 150, and the logic circuit 160.

1-7. Seventh Embodiment

Next, a seventh embodiment will be described with reference to FIGS. 14 and 15. First, a configuration outline of an information processing device according to the seventh embodiment will be described with reference to FIG. 14.

[1-7-1. Configuration Outline of Information Processing Device According to Seventh Embodiment]

Figure 14:
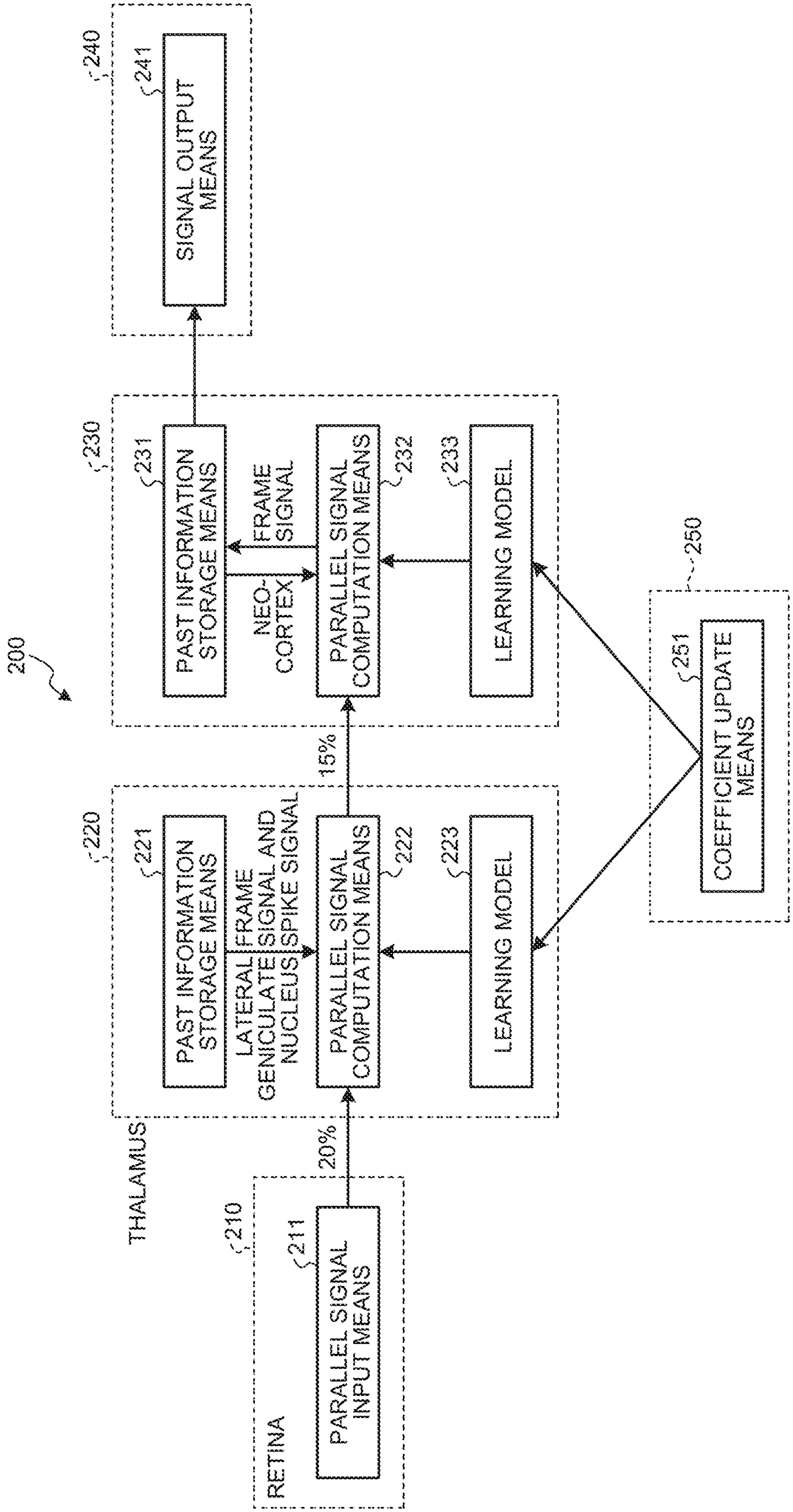
FIG. 14 is a diagram depicting a configuration example of an information processing device according to a seventh embodiment of the present disclosure.

FIG. 14 is a diagram depicting a configuration example of an information processing device according to the seventh embodiment of the present disclosure. An information processing device 200 depicted in FIG. 14 has a configuration imitating neuromorphic computation. In FIG. 14, the information processing device 200 includes five functional blocks, namely, an input layer 210, a first computation layer 220, a second computation layer 230, an output layer 240, and a control layer 250. The input layer 210 functioning as input means of the information processing device 200 includes a parallel signal input means 211. The first computation layer 220 functioning as a computation means in the information processing device 200 includes a past information storage means 221, a parallel signal computation means 222, and a learning model 223. In addition, the second computation layer 230 functioning as a computation means in the information processing device 200 includes a past information storage means 231, a parallel signal computation means 232, and a learning model 233. The output layer 240 functioning as output means of the information processing device 200 includes a signal output means 241. The control layer 250 functioning as an update means in the information processing device 200 includes a coefficient update means 251.

The parallel signal input means 211 in the information processing device 200 corresponds to a retina of a human. In addition, the past information storage means 221 and 231 of the information processing device 200 correspond to the thalamus of a human. In addition, the information processing device 200 includes two parallel signal computation means 222 and 232. The parallel signal computation means 222 corresponds to the lateral geniculate nucleus, while the parallel signal computation means 232 corresponds to the neocortex. The human brain is said to have a computation device of a two-layer structure, and signals are output using past information, learning models 223 and 233, and input signals.

The input signal used for the operation is substantially 25-20% of all signals, and for example, in the second computation layer 230 of the second layer, about 75% of the computation result of the first computation layer 220 of the first layer is used as an input. It is also possible to configure the information processing device 200 (system) in a form imitating such a computation system. In the example of FIG. 14, the data volume of the parallel signal input means 211 may be 25% or less of the total, and the data volume of the data input means in the subsequent stage may be 20% or less of the first stage. Note that the information processing device 200 may also be used as a device (information processing device 100 to 100E) for implementation of the information processing of the first to sixth embodiments described above.

[1-7-2. Configuration of Information Processing Device According to Seventh Embodiment]

Here, an example of a configuration of the information processing device 200 described above will be described with reference to FIG. 15. FIG. 15 is a diagram depicting a configuration example of the information processing device according to a seventh embodiment of the present disclosure.

Figure 15:
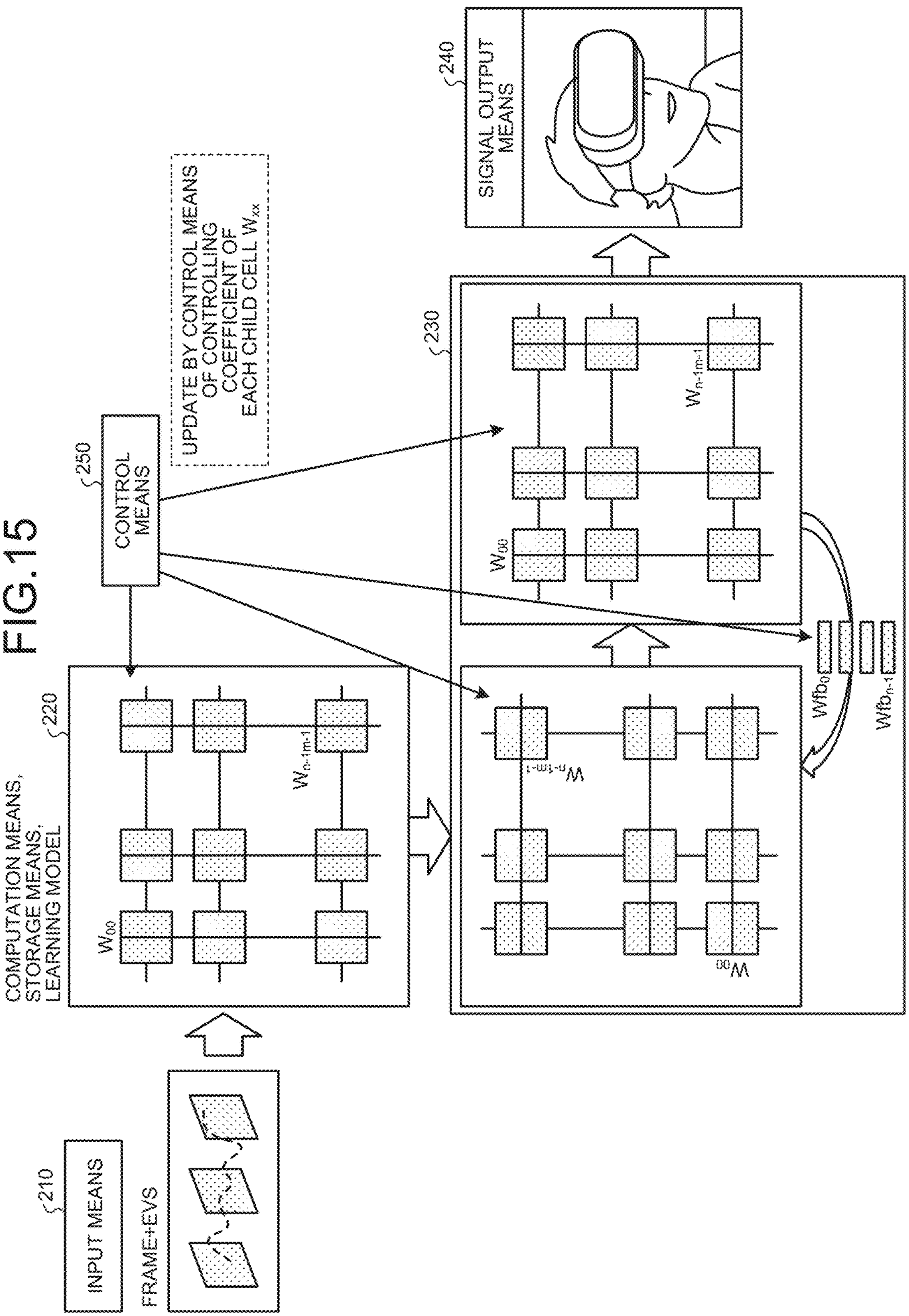
FIG. 15 is a diagram depicting a configuration example of the information processing device according to the seventh embodiment of the present disclosure.

As depicted in FIG. 15, the input layer 210 functioning as an input means of the information processing device 200 may use frames or EVS. Furthermore, the first computation layer 220 of the information processing device 200 corresponds to a computation means, a storage means, and a learning model, and may use a computation device or the like constituted with cells. In FIG. 15, the first computation layer 220 is depicted in one stage, but may have a configuration of at least one or more (plurality of) stages. Furthermore, the second computation layer 230 of the information processing device 200 corresponds to a computation means, a storage means, and a learning model, and may use a computation device or the like constituted with cells. Similarly, the second computation layer 230 is depicted in two stages in FIG. 15, but may be a plurality of stages of at least four stages or more.

The output layer 240 functioning as output means of the information processing device 200 may use AR glasses or the like. Furthermore, the control layer 250 functioning as a control means in the information processing device 200 may use a control circuit or the like that controls coefficients of the individual child cells Wxx of the first computation layer 220, the second computation layer 230, and the like.

1-8. Application Examples

Examples of the application will be described below. Hereinafter, a case where the information processing device 100 is applied to an application will be described as an example, in which the information processing devices 100A to 100E may be used, not limited to the information processing device 100.

[1-8-1. Robot]

Figure 16:
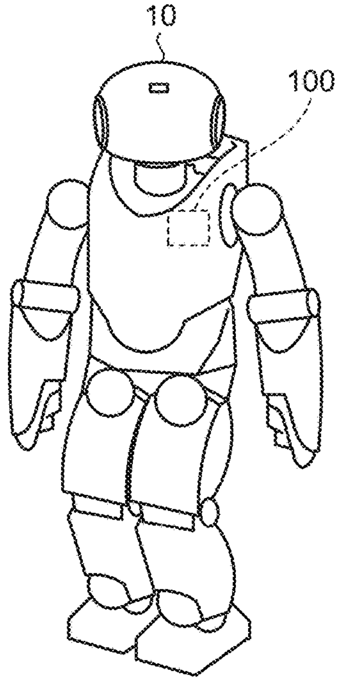
FIG. 16 is a diagram depicting an example of an application using an information processing device.

First, an example of using the information processing device 100 for information processing such as control of a robot 10 depicted in FIG. 16 will be described. FIG. 16 is a diagram depicting an example of an application using the information processing device. FIG. 16 depicts a case where the information processing device 100 is installed on the robot 10. Note that FIG. 16 is merely an example, and the information processing device 100 itself may be the robot 10.

For example, the information processing device 100 can suppress the influence of a delay in information processing in operations such as control of the robot 10. In FIG. 16, the robot 10 can act with more human-like vision and future prediction functions, enabling the robot 10 to act like a person. For example, the robot 10 can move on the prediction of the future several hundred milliseconds ahead. For example, it takes 50 milliseconds for a command from the brain to be transmitted to muscles of a person, and thus, the person controls the body using a future prediction based on visual information. In this respect, the robot 10 that takes an action using the future prediction can take an action closer to a person.

[1-8-2. Activity on Virtual Space]

Figure 17:
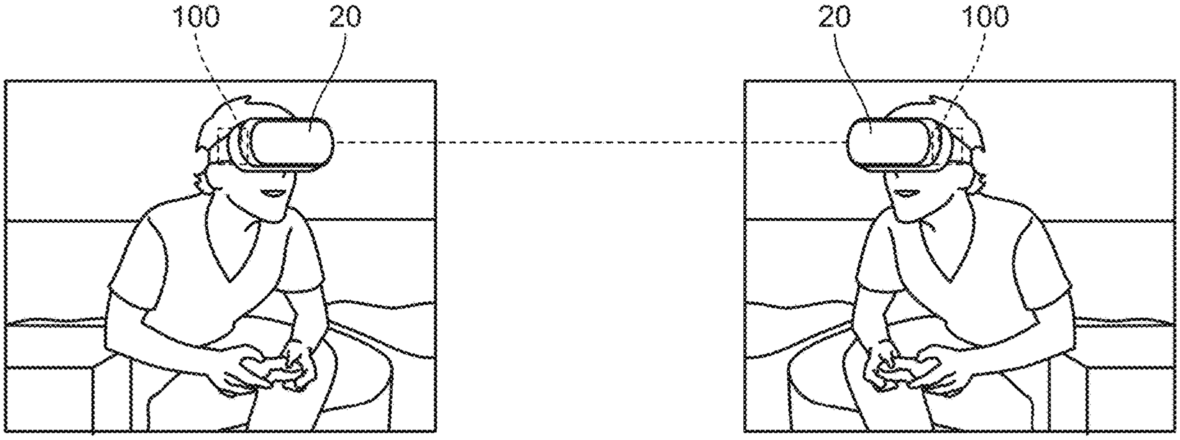
FIG. 17 is a diagram depicting an example of an application using an information processing device.

Next, an example of using the information processing device 100 for information processing such as display using AR glasses 20 depicted in FIG. 17 will be described. FIG. 17 is a diagram depicting an example of an application using the information processing device. FIG. 17 depicts a case where the information processing device 100 is installed in the AR glasses 20. Note that FIG. 17 is merely an example, and the information processing device 100 itself may be the AR glasses 20.

For example, the information processing device 100 can suppress the influence of a delay in information processing such as display of the AR glasses 20. In FIG. 17, using the AR glasses 20, there is no need for users to be together and real-time activities can be shared on the virtual space. In FIG. 17, the user can exchange information with the other party in real time with zero latency in the virtual space.

[1-8-3. Other Application Examples]

Note that the above is merely an example, and the information processing device 100 may be used in various applications. For example, the information processing device 100 may be applied to real-time remote activity via a robot. This enables real-time remote control of the remotely located robot.

Furthermore, the information processing device 100 may be applied to real-time information feedback such as motion analysis in sports. This also makes it possible to obtain real-time activity feedback.

[1-9. Example of Application to Mobile Body]

In addition to the above applications, the technology according to the present disclosure (the present technology) can be applied to various products. For example, the technology according to the present disclosure may be applied to devices mounted on any of mobile body such as automobiles, electric vehicles, hybrid electric vehicles, motorcycles, bicycles, personal mobility, airplanes, drones, ships, and robots.

Figure 18:
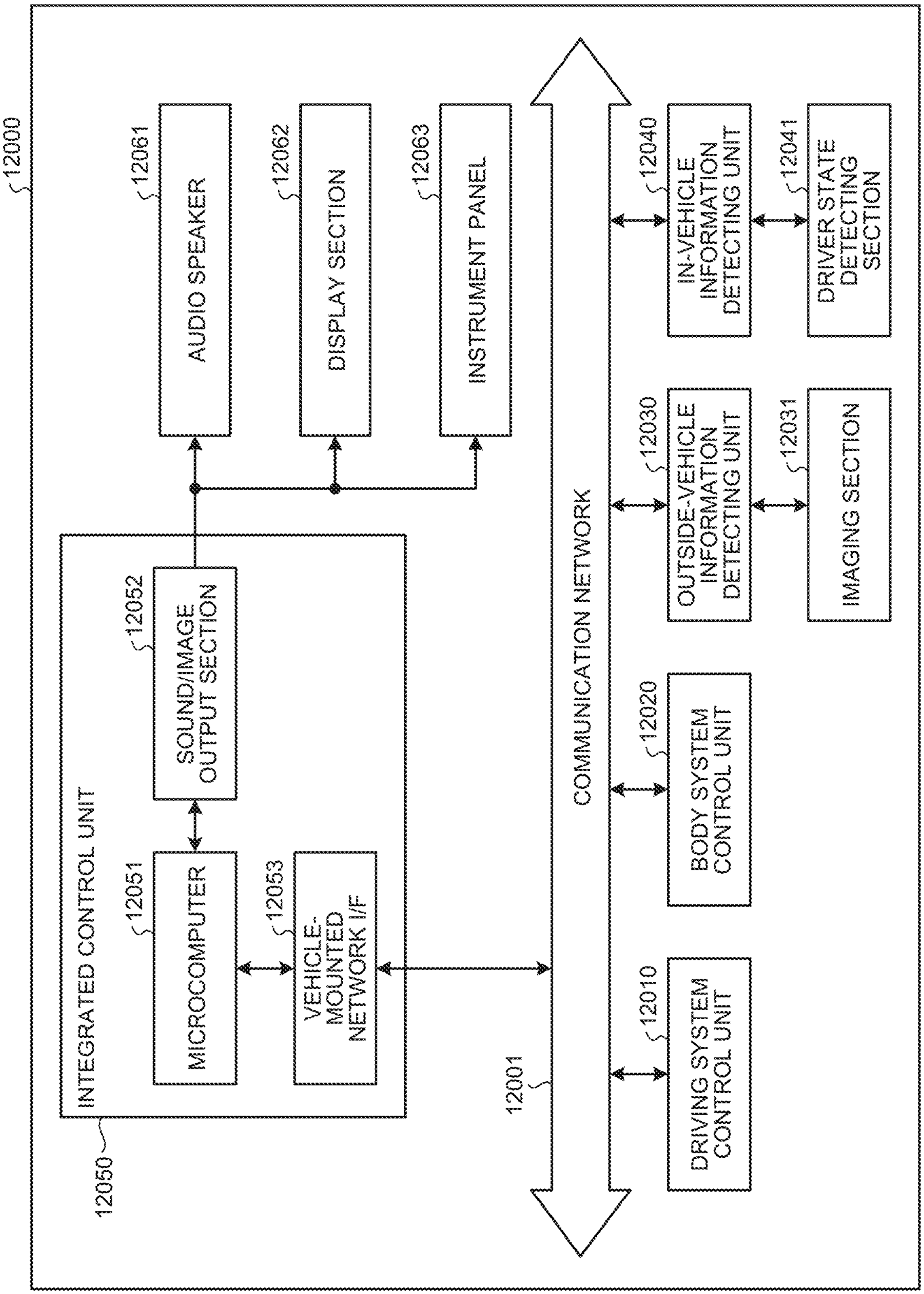
FIG. 18 is a block diagram depicting an example of schematic configuration of a vehicle control system.

FIG. 18 is a block diagram depicting an example of schematic configuration of a vehicle control system as an example of a mobile body control system to which the technology according to an embodiment of the present disclosure can be applied.

A vehicle control system 12000 includes a plurality of electronic control units connected to each other via a communication network 12001. In the example depicted in FIG. 18, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are depicted as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. based on the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. based on detection information input from the driver state detecting section 12041, the in-vehicle information detecting unit 12040 may calculate a degree of fatigue of the driver or a degree of concentration of the driver, or may determine whether the driver is dozing.

The microcomputer 12051 can computes a control target value for the driving force generating device, the steering mechanism, or the braking device based on the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which allows the vehicle to travel autonomously without depending on the operation of the driver, or the like, by controlling the driving force generating device, the steering mechanism, the braking device, or the like based on the information about the outside or inside of the vehicle which information is obtained by the outside-vehicle information detecting unit 12030 or the in-vehicle information detecting unit 12040.

In addition, the microcomputer 12051 can output a control command to the body system control unit 12020 based on the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 18, an audio speaker

12061, a display section 12062, and an instrument panel 12063 are depicted as the output device. The display section 12062 may, for example, include at least one of an on-board display and a head-up display.

Figure 19:
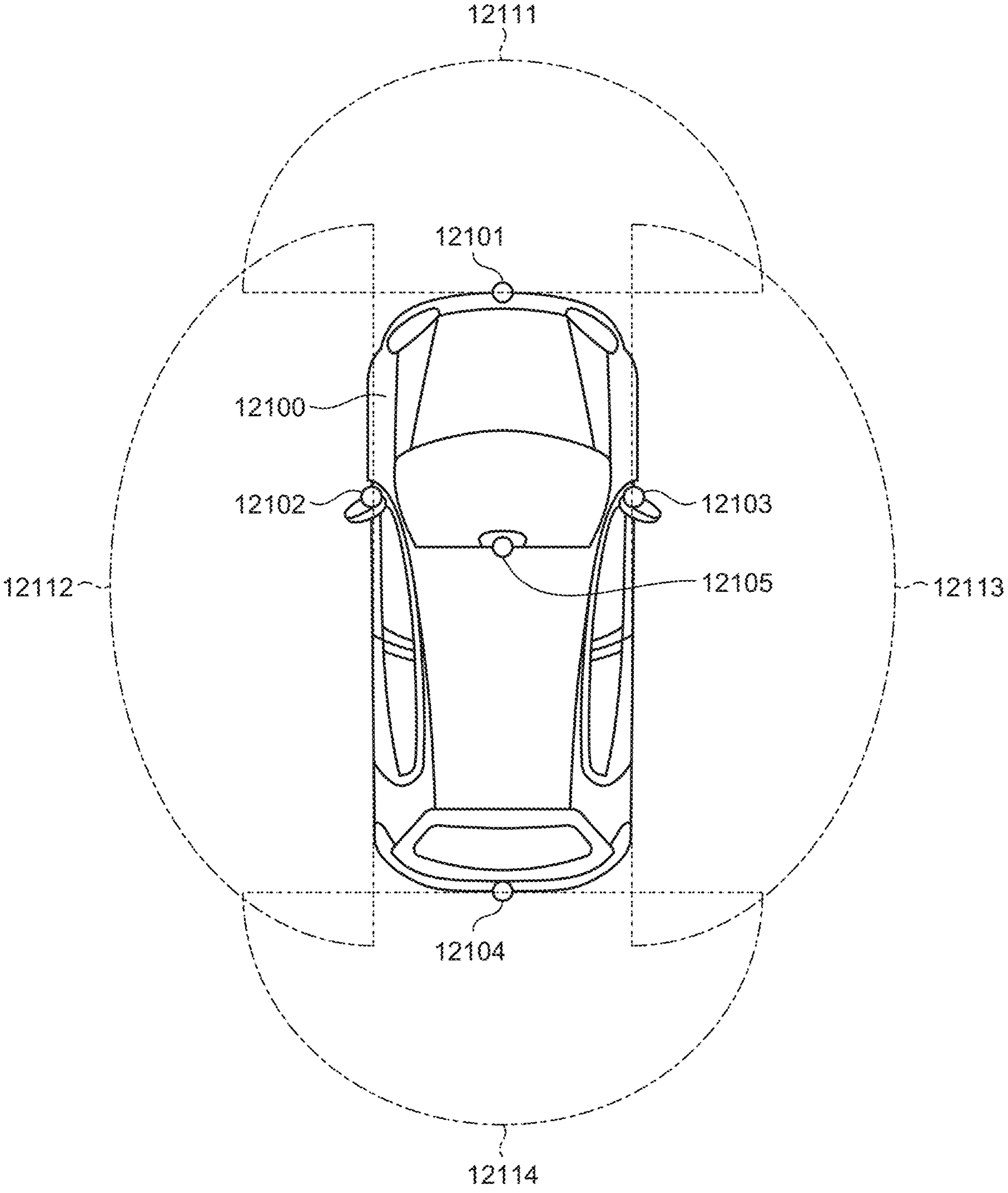
FIG. 19 is a diagram of assistance in explaining an example of installation positions of an outside-vehicle information detecting section and an imaging section.

FIG. 19 is a diagram depicting an example of the installation position of the imaging section 12031.

In FIG. 19, a vehicle 12100 has imaging sections 12101, 12102, 12103, 12104, and 12105 as the imaging section 12031.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided on the rear bumper or the back door mainly acquires an image behind the vehicle 12100. The images in front acquired by the imaging sections 12101 and 12105 are mainly used for detecting a preceding vehicle or a pedestrian, an obstacle, a traffic light, a traffic sign, a lane, or the like.

Incidentally, FIG. 19 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) based on the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that allows the vehicle to travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects based on the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

Hereinabove, an example of the vehicle control system to which the technology according to the present disclosure is applicable has been described. The technology according to the present disclosure can be suitably applied to the integrated control unit 12050 among the configurations described above. Specifically, in a case where the information processing device 100 depicted in FIG. 3 is applied to the integrated control unit 12050, the computation means 110 can be applied to the microcomputer 12051. In a case where the computation means 110 is applied to the microcomputer 12051, for example, the signal output means 104 and the input means 101 can be applied to the vehicle-mounted network I/F 12053 and the sound/image output section 12052. By applying the technology according to the present disclosure to the integrated control unit 12050 in this manner, it is possible to suppress occurrence of delay, enabling various outputs such as display with high real-time property.

The above application is merely an example, and each configuration of the information processing device 100 may be applied as various configurations of the vehicle control system 12000. For example, the computation means 110 may be applied to the outside-vehicle information detecting unit 12030 or the in-vehicle information detecting unit 12040. By applying the technology according to the present disclosure to the outside-vehicle information detecting unit 12030 or the in-vehicle information detecting unit 12040 in this manner, it is possible to suppress occurrence of delay, leading to achievement of detection with high real-time property. In this case, for example, the input means 101 may be applied to the imaging section 12031 or the driver state detecting section 12041. For example, the signal output means 104 may be applied to the driving system control unit 12010 or the body system control unit 12020. By applying the technology according to the present disclosure to the driving system control unit 12010 or the body system control unit 12020, it is possible to suppress occurrence of delay, leading to achievement of control with high real-time property. Furthermore, for example, the signal output means 104 may be applied to the audio speaker 12061, the display section 12062, or the instrument panel 12063. Furthermore, by applying the technology according to the present disclosure to the audio speaker 12061, the display section 12062, or the instrument panel 12063 in this manner, it is possible to suppress occurrence of delay, leading to achievement of output with high real-time property.

2. OTHERS

The process according to each of embodiments described above may be performed in various different forms (modifications) in addition to each of embodiments or modifications described above.

Furthermore, among each processing described in the above embodiments, all or a part of the processing described as being performed automatically can be manually performed, or the processing described as being performed manually can be performed automatically by a known method. In addition, the processing procedures, specific names, and information including various data and parameters depicted in the above specifications or drawings can be changed in any manner unless otherwise specified. For example, a variety of information depicted in each of the drawings are not limited to the information depicted.

In addition, each of components of each device is provided as a functional and conceptional illustration and thus does not necessarily need to be physically configured as depicted. That is, the specific form of distribution/integration of each device is not limited to those depicted in the drawings, and all or a part thereof may be functionally or physically distributed or integrated into arbitrary units according to various loads and use conditions.

Furthermore, the above-described embodiments and modifications can be appropriately combined within a range implementable without contradiction of processing.

Here, the information processing device 100 will be described as an example, but application may be performed to any of the above. For example, the information processing device 100 includes an input means 101, at least one or more future information generation means 102, and an output means that outputs arbitrary information. Regarding future information, the future information is generated from at least one or more past information generation means 103. Furthermore, for example, the information processing device 100 has a structure including at least one or more current information generation means and in which arbitrary information is output from the combining means by the output means. Regarding future information, the future information is generated from at least one or more past information generation means 103 and at least one or more current information means.

For example, the past information generation means 103 includes a combination of at least two or more generation means of past information generation from one or more future generation means and one or more current information generation means, and past information generation stored in advance in the storage means. For example, regarding the past information stored in the storage means, the past information is updated using an information update means generated from one of the current information generation means and the future information generation means 102. For example, regarding the past information stored in the storage means, the past information is updated using an information update means generated from both of the current information generation means and the future information generation means 102.

For example, the amount of past information in the storage means decreases with time. The reduction coefficient of the past information amount has at least two types of time constants. For example, the past information of the storage means includes stored content with the information amount decreasing with time and stored content with the information not decreasing until the next update.

For example, the input means 101 is spatially sparse and dense in time. For example, the input means 101 is an EVS. For example, the time for information generation by the future information generation means 102 has a delay equal to or less than the delay of the input means 101 and the signal output means 104. For example, the computation means 110 computes only data that changes in time series. For example, the computation means 110 executes computation by using all the inter-frame information within the delay of the imaging system or the display system.

For example, the input means 101 includes an output signal from one or more low-resolution high-speed ADCs and an output signal from one or more high-resolution low-speed ADCs. For example, the input means 101 includes physical signal detection means created individually. For example, the input means 101 includes at least two or more detection means created in an identical detection device. For example, the information processing device 100 has a recursive structure from an information path to the past information generation means 103 to an information path to the future information generation means 102 in a read pipeline path from the input means 101 to the output means.

The effects described in the present specification are merely examples, and thus, there may be other effects, not limited to the exemplified effects.

3. Effects According to Present Disclosure

As described above, the information processing device (for example, this corresponds to the information processing device 100 in the first embodiment) according to the present disclosure includes the acquisition means (for example, this corresponds to the acquisition means 111 in the first embodiment) and the generation means (for example, this corresponds to the future information generation means 102 in the first embodiment). The acquisition means acquires first information (for example, this corresponds to current information in the first embodiment) which is part of the information regarding the target region. Based on the first information acquired by the acquisition means, the generation means generates second information (for example, this corresponds to future information in the first embodiment) corresponding to the second time, which is later than the first time being the time corresponding to the first information.

In this manner, based on the first information that is part of the information regarding the target region, the information processing device according to the present disclosure generates the second information corresponding to the second time which is later than the first time which is the time corresponding to the first information, making it possible to efficiently generate information.

The acquisition means acquires first information, which is part of the information regarding the target region detected by the sensor. Based on the first information, the generation means generates the second information predicted to be detected by the sensor in the second time. In this manner, based on the first information detected by the sensor, the information processing device can generate the second information predicted to be detected by the sensor at the second time, making it possible to efficiently generate information regarding the information predicted to be detected by the sensor.

In addition, the acquisition means acquires the first information that is information of a portion necessary for processing by the generation means among the information regarding the target region. In this manner, the information processing device can efficiently generate information by using only information of a portion necessary for processing by the generation means.

The acquisition means acquires first information, which is information regarding a portion including a change in the first time among the information regarding the target region. In this manner, the information processing device can efficiently generate information by using only the information of the portion having a change during the first time.

In addition, the acquisition means acquires the first information, which is sparse with respect to the information regarding the target region. In this manner, the information processing device can efficiently generate information by using the first information which is sparse with respect to the information regarding the target region.

In addition, the acquisition means acquires the first information corresponding to a plurality of portions discretely located in the target region. In this manner, the information processing device can efficiently generate information by using the first information corresponding to the plurality of portions discretely located in the target region.

In addition, the acquisition means acquires the first information corresponding to a portion of a predetermined ratio or less in the target region. In this manner, the information processing device can efficiently generate information by using the first information corresponding to the portion of the predetermined ratio or less in the target region.

The generation means generates second information that is encoded data corresponding to the second time. In this manner, by generating the encoded data corresponding to the second time, the information processing device can efficiently generate the information used in the signal output means or the like.

The generation means generates the second information based on the first information and the third information (for example, this corresponds to the past information in the first embodiment) corresponding to the third time which is the time earlier than the first time. In this manner, the information processing device generates the second information based on the third information corresponding to the third time which is a time earlier than the first time so as to perform feedback of the information generated in the past, making it possible to perform information generation with high accuracy.

The generation means generates the second information by using the third information generated earlier than the generation of the second information. In this manner, by generating the second information by using the third information generated earlier than the generation of the second information so as to perform feedback of the information generated in the past, making it possible to perform information generation with higher accuracy.

The generation means generates the second information by using the learning model updated by using the third information. In this manner, the information processing device generates the second information by using the learning model updated using the third information, making it possible to perform information generation with higher accuracy.

In addition, the generation means generates the second information by using the learning model updated based on the first information. In this manner, the information processing device generates the second information by using the learning model updated based on the first information, making it possible to perform information generation with higher accuracy.

The generation means generates the second information by using the learning model updated by using the first information. In this manner, the information processing device generates the second information by using the learning model updated using the first information, making it possible to perform information generation with higher accuracy.

Furthermore, the information processing device includes a combining means (the combining means 106 in the second embodiment) that combines the second information with the other information to generate combined information to be used for output. In this manner, by generating the combined information to be used for output by combining the second information with the other information, the information processing device can appropriately generate the information to be used for output.

In addition, using the first information, the generation means (the current information generation means 105 in the second embodiment) generates the fourth information (for example, this corresponds to current Encode data in the second embodiment) used for combining with the second information. The combining means combines the second information and the fourth information to generate combined information. In this manner, the information processing device can appropriately generate information to be used for output by combining the fourth information generated using the first information with the second information.

The generation means generates fourth information that is encoded data corresponding to the first time. In this manner, the information processing device generates the combined information using the encoded data corresponding to the first time, making it possible to appropriately generate the information to be used for output.

The acquisition means acquires the first information corresponding to a part of the information regarding the target region which is an image. The generation means generates second information corresponding to the image at the second time based on the first information. In this manner, the information processing device can generate the second information corresponding to the image at the second time based on the first information corresponding to a part of the image, making it possible to efficiently generate information regarding the image.

The acquisition means acquires first information corresponding to a pixel having a change in the image. The generation means generates second information corresponding to the image at the second time based on the first information. In this manner, the information processing device can generate the second information corresponding to the image at the second time based on the first information corresponding to the pixel having a change in the image, making it possible to efficiently generate information by using only the information of the pixel having a change.

4. Hardware Configuration

Figure 20:
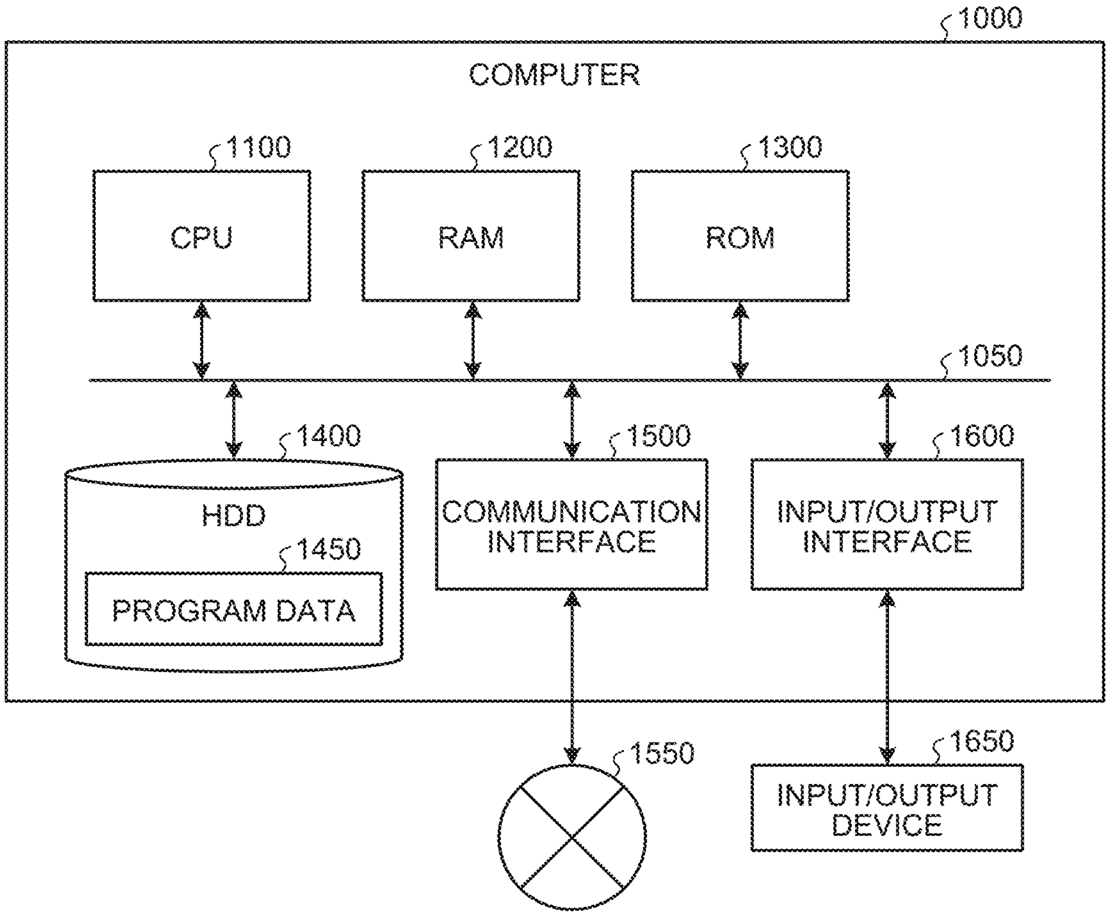
FIG. 20 is a hardware configuration diagram depicting an example of a computer that actualizes functions of an information processing device.

The information processing device 100 or the like according to each of the above-described embodiments is implemented by a computer 1000 having a configuration as depicted in FIG. 20, for example. FIG. 20 is a hardware configuration diagram depicting an example of the computer 1000 that implements functions of the information processing device. Hereinafter, the information processing device 100 according to the embodiment will be described as an example. The computer 1000 includes a CPU 1100, RAM 1200, read only memory (ROM) 1300, a hard disk drive (HDD) 1400, a communication interface 1500, and an input/output interface 1600. Individual components of the computer 1000 are interconnected by a bus 1050.

The CPU 1100 operates based on a program stored in the ROM 1300 or the HDD 1400 so as to control each of components. For example, the CPU 1100 develops the program stored in the ROM 1300 or the HDD 1400 into the RAM 1200 and executes processing corresponding to various programs.

The ROM 1300 stores a boot program such as a basic input output system (BIOS) executed by the CPU 1100 when the computer 1000 starts up, a program dependent on hardware of the computer 1000, or the like.

The HDD 1400 is a non-transitory computer-readable recording medium that records a program executed by the CPU 1100, data used by the program, or the like. Specifically, the HDD 1400 is a recording medium that records an information processing program according to the present disclosure, which is an example of program data 1450.

The communication interface 1500 is an interface for connecting the computer 1000 to an external network 1550 (for example, the Internet). For example, the CPU 1100 receives data from other devices or transmits data generated by the CPU 1100 to other devices via the communication interface 1500.

The input/output interface 1600 is an interface for connecting an input/output device 1650 with the computer 1000. For example, the CPU 1100 receives data from an input device such as a keyboard or a mouse via the input/output interface 1600. In addition, the CPU 1100 transmits data to an output device such as a display, a speaker, or a printer via the input/output interface 1600. Furthermore, the input/output interface 1600 may function as a media interface for reading a program or the like recorded on predetermined recording medium (or simply medium). Examples of the media include optical recording media such as a digital versatile disc (DVD) or a phase change rewritable disk (PD), a magneto-optical recording medium such as a magneto-optical disk (MO), a tape medium, a magnetic recording medium, and semiconductor memory.

For example, when the computer 1000 functions as the information processing device 100 according to the embodiment, the CPU 1100 of the computer 1000 executes the information processing program loaded on the RAM 1200 so as to implement the functions of the computation means 110 and the like. Furthermore, the HDD 1400 stores the information processing program according to the present disclosure or data in the storage section. While the CPU 1100 executes program data 1450 read from the HDD 1400, the CPU 1100 may acquire these programs from another device via the external network 1550, as another example.

5. OTHER EMBODIMENTS

The information processing device according to the first to seventh embodiments described above is merely an example. The information processing device is not limited to the configurations depicted in the first to seventh embodiments, and any configuration can be adopted. For example, the information processing device is not limited to the recurrent (feedback) configuration, and may have a feed-forward type configuration. This point will be exemplified below.

5-1. Eighth Embodiment

Figure 22:
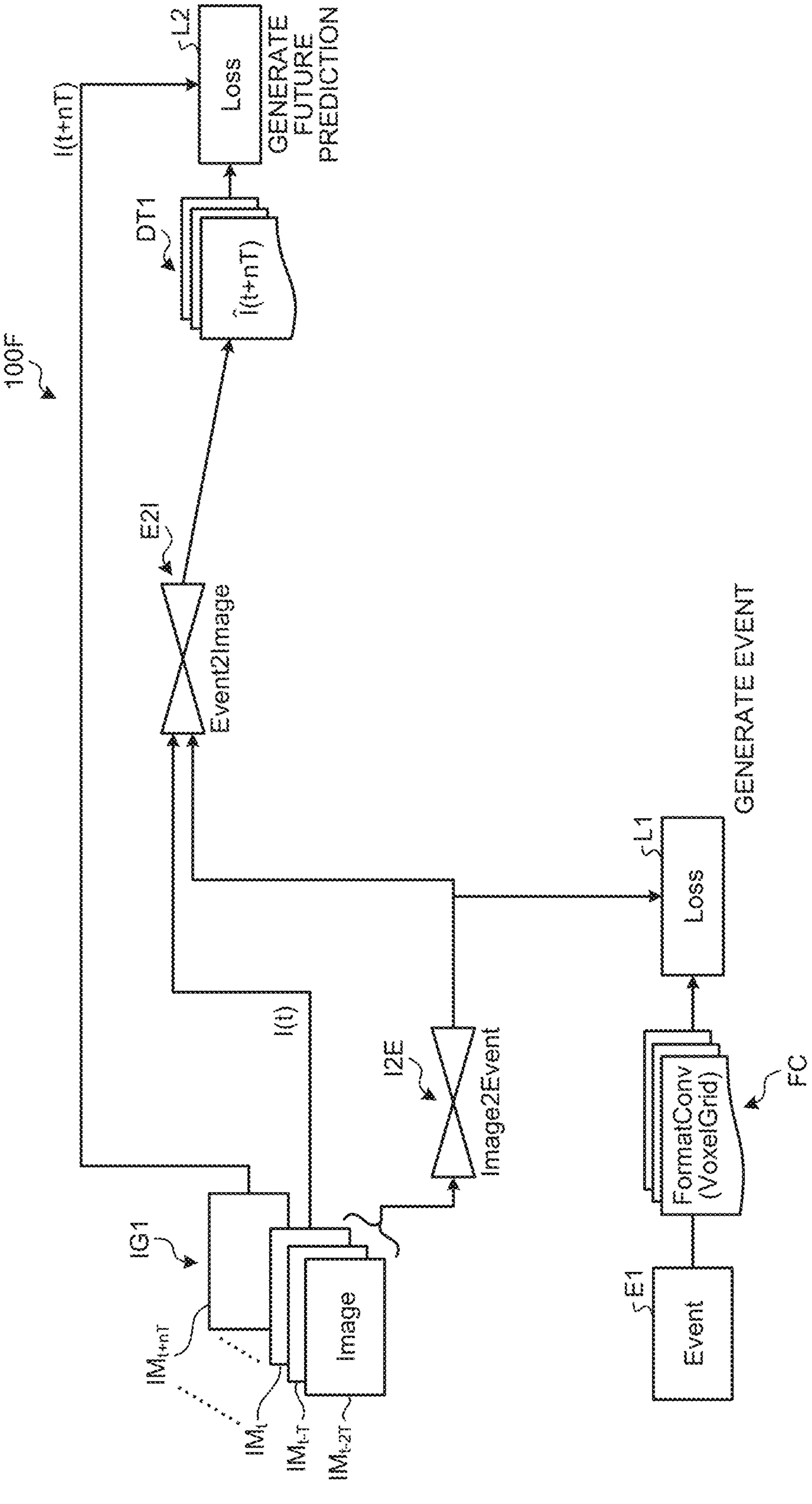
FIG. 22 is a diagram depicting a configuration example of an information processing device according to an eighth embodiment of the present disclosure.
Figure 23:
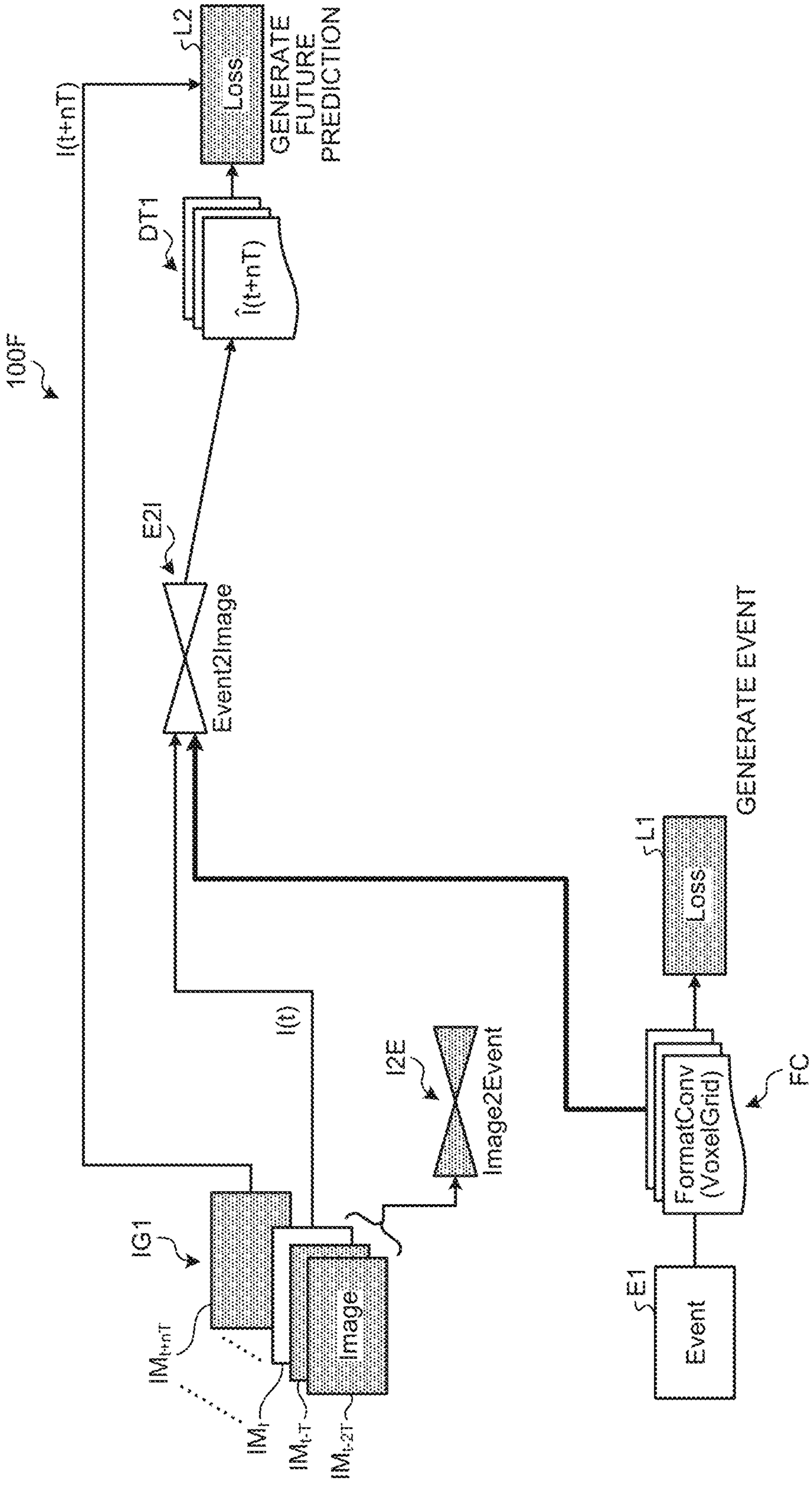
FIG. 23 is a diagram depicting a configuration example of the information processing device according to the eighth embodiment of the present disclosure.

First, an outline of a configuration and processing of an information processing device according to an eighth embodiment will be described with reference to FIGS. 22 and 23. FIGS. 22 and 23 are diagrams depicting a configuration example of the information processing device according to the eighth embodiment of the present disclosure. Hereinafter, description of the points similar to the above description will be omitted as appropriate.

Hereinafter, the configuration of an information processing device 100F, information used for processing, and the like will be described with reference to FIG. 22, and then processing at the time of learning will be described. The information processing device 100F depicted in FIG. 22 has a configuration corresponding to each of the input means, the computation means, and the signal output means described above. For example, the computation means of the information processing device 100F does not include the past information generation means described above. For example, the computation means of the information processing device 100F includes an acquisition means, a future information generation means, a current information generation means, and a combining means.

An image group IG1 in FIG. 22 includes a plurality of images such as an image $IM_{t-2T}$ corresponding to time point t−2T, an image $IM_{t-T}$ corresponding to time point t−T, an image $IM_t$ corresponding to time point t, and an image $IM_{t+nT}$ corresponding to time point t+nT. Note that "I(t)" depicted in FIG. 22 corresponds to the image $IM_t$, and "I(t+nT)" corresponds to the image $IM_{t+nT}$. For example, time point t corresponds to the past closest to the present, and time point t+nT corresponds to the future advanced from time point t by the time nT. Note that n may be set to any value or may be parameterized. In FIG. 22, the image group IG1 is used as training data.

In addition, event data E1 denoted as "Event" in FIG. 22 indicates an event signal output corresponding to an image. For example, the event data E1 indicates the detected luminance change. For example, the event data E1 is asynchronous and sparse data with finely divided time (high time resolution). For example, the event data E1 may be an output from the EVS described above.

In FIG. 22, the information processing device 100F acquires, as input signals, a plurality of frame images of the image group IG1 and an event signal output which is the event data E1 corresponding to the images. The image group IG1 and the event data E1 are detected by a certain sensor such as the above-described sensor, for example. For example, the information processing device 100F may use the image group IG1 and the event data E1 detected by one sensor. In this manner, the input may be the output of both signals from a single sensor.

Note that the above is merely an example, and for example, the input may each come from a frame sensor and an event sensor that can perform a global shutter operation and are mounted adjacent to each other with the influence of parallax eliminated as much as possible. Also, the number of sensors may be any number, for example, there may be two frame sensors and there may be two event sensors.

An image event conversion I2E denoted as "Image2Event" in FIG. 22 is a model that outputs information (image) indicating an event corresponding to an input image. The image event conversion I2E uses an image as an input and outputs an image of an event corresponding to the input. In this manner, based on an image, the image event conversion I2E generates information indicating an event corresponding to the image. Therefore, even when the data volume of the event is small, the information of the event can be generated by the image event conversion I2E, making it possible to increase the data volume used for the learning. The information processing device 100F executes training processing to be described below using the information generated by the image event conversion I2E. Note that the image event conversion I2E is a configuration used at the time of training processing and is not used at the time of inference processing.

Furthermore, the event image conversion E2I denoted as "Event2Image" in FIG. 22 is a model that outputs future information (image) from the image and the information indicating the event. The event image conversion E2I corresponds to the above-described computation section and data combining section. For example, the event image conversion E2I outputs information indicating whether the luminance has changed. The event image conversion E2I uses an image and information indicating an event as an input, and outputs future information (image) corresponding to the input. In the information diagram 22, as indicated by future information DT1, the event image conversion E2I uses an image and information indicating an event as an input, and outputs future information (image) corresponding to the input. The future information DT1 in FIG. 22 corresponds to the above-described combined data. Note that "^" (hat) added above characters in the diagram indicates that the information is predicted (estimated), although "^" (hat) will be omitted in the description. For example, in a case where the image $IM_t$ corresponding to time point t and the information of the event corresponding to the image $IM_t$ are input, the event image conversion E2I outputs the image I(t+nT) corresponding to time point t+nT as future information.

The format conversion FC indicated as "Format Conv" in FIG. 22 generates, from the event data E1, an input to the event image conversion E2I. The format conversion FC corresponds to the above-described computation section. The format conversion FC generates, from the event data E1, information to be input to the event image conversion E2I using any method such as a Voxel Grid. The format conversion FC generates information similar to the output of the image event conversion I2E by adding up (integrating) portions where the event has occurred in the image. The format conversion FC uses integration processing or the like to generate information indicating the contour of the face, the motion of waving a hand, and the like in a certain period of time. Note that the above-described processing is merely an example, and the event image conversion E2I may generate information to be input to the event image conversion E2I by any method.

A loss function L1 and a loss function L2 expressed as "Loss" in FIG. 22 are used at the time of training processing. For example, the loss function L1 is used for the training so that the output of the image event conversion I2E and the output of the format conversion FC approach each other. Furthermore, for example, the loss function L2 is a loss function used for the training so that the output of the event image conversion E2I approaches the future information of implementation.

The information processing device 100F trains the model by the above-described configuration and information. For example, the information processing device 100F trains the image event conversion I2E and the event image conversion E2I. First, the information processing device 100F trains the image event conversion I2E. For example, the information processing device 100F fixes the event image conversion E2I and trains the image event conversion I2E.

Then, the information processing device 100F fixes the image event conversion I2E and trains the event image conversion E21. In FIG. 22, the information processing device 100F generates the event image conversion E2I by performing training so that the future information DT1 output by the event image conversion E21 approaches the implemented future information. For example, the information processing device 100F generates a model corresponding to the event image conversion E21 by performing training so that the image I(t+nT) output from the event image conversion E2I approaches the image $IM_{t+nT}$ corresponding to the actual time point t+nT. In this case, the information processing device 100F inputs the image $IM_t$ corresponding to time point t and the output of the image event conversion I2E corresponding to time point t to the event image conversion E2I, and performs training so that the image I(t+nT) output by the event image conversion E2I approaches the image $IM_{t+nT}$ corresponding to the actual time point t+nT.

With this operation, the information processing device 100F generates the event image conversion E2I that generates a future image from the acquired latest frame image and the event information slightly later than the frame. As described above, the information processing device 100F uses a known future image as a ground truth at the time of training, compares the generated image with the ground truth image in the training processing.

Hereinafter, processing at the time of inference in the information processing device 100F will be described with reference to FIG. 23. Note that hatched configurations and information in FIG. 23 are not to be used in the inference processing depicted in FIG. 23. For example, it is indicated that the image event conversion I2E is not to be used in the inference processing depicted in FIG. 23. In this manner, at the time of inference, the information processing device 100F performs inference by using the event image conversion E2I without using the image event conversion I2E.

Furthermore, in the inference processing depicted in FIG. 23, the information processing device 100F executes, as the inference processing, processing of generating (predicting) an image corresponding to time point t+nT, which is a time later than time point t, by using an image $IM_t$ corresponding to time point t in the image group IG1. That is, the information processing device 100F performs inference through the event image conversion E2I based on the original frame image and a signal obtained by performing signal processing (voxelization or the like) on the Event.

For example, the information processing device 100F uses the image $IM_t$ corresponding to time point t and the output of the format conversion FC corresponding to time point t to generate future information (image) corresponding to the future time point t+nT. For example, the information processing device 100F inputs the image $IM_t$ corresponding to time point t and the output of the format conversion FC to which the event data E1 before time point t has been input to the event image conversion E2I, and causes the event image conversion E2I to output an image. With this operation, the information processing device 100F generates the image output by the event image conversion E2I as the future information (image). Note that the above-described processing is merely an example, and the information processing device 100F may generate the future information using various types of information.

5-2. Ninth Embodiment

Figure 24:
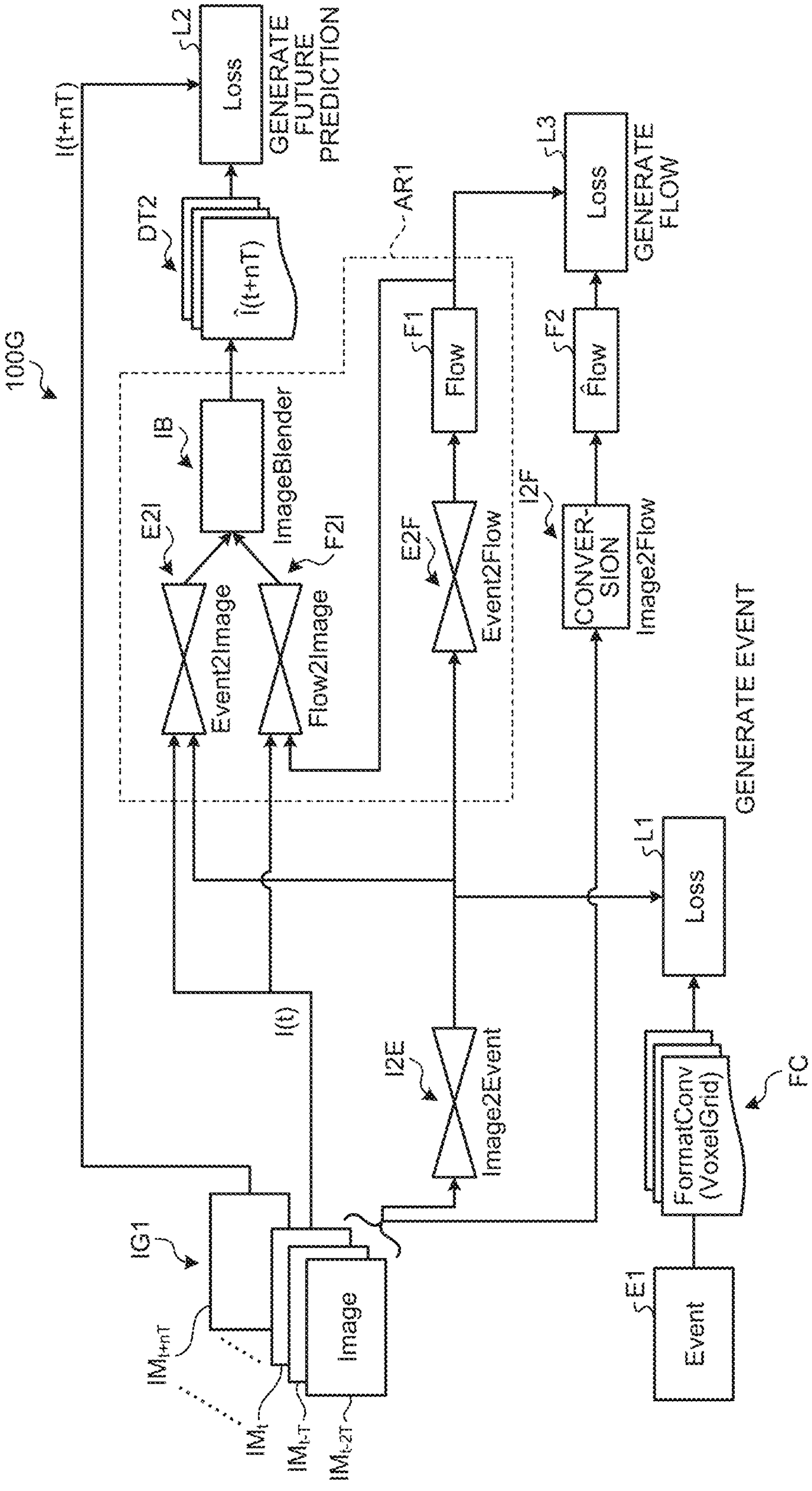
FIG. 24 is a diagram depicting a configuration example of an information processing device according to a ninth embodiment of the present disclosure.
Figure 25:
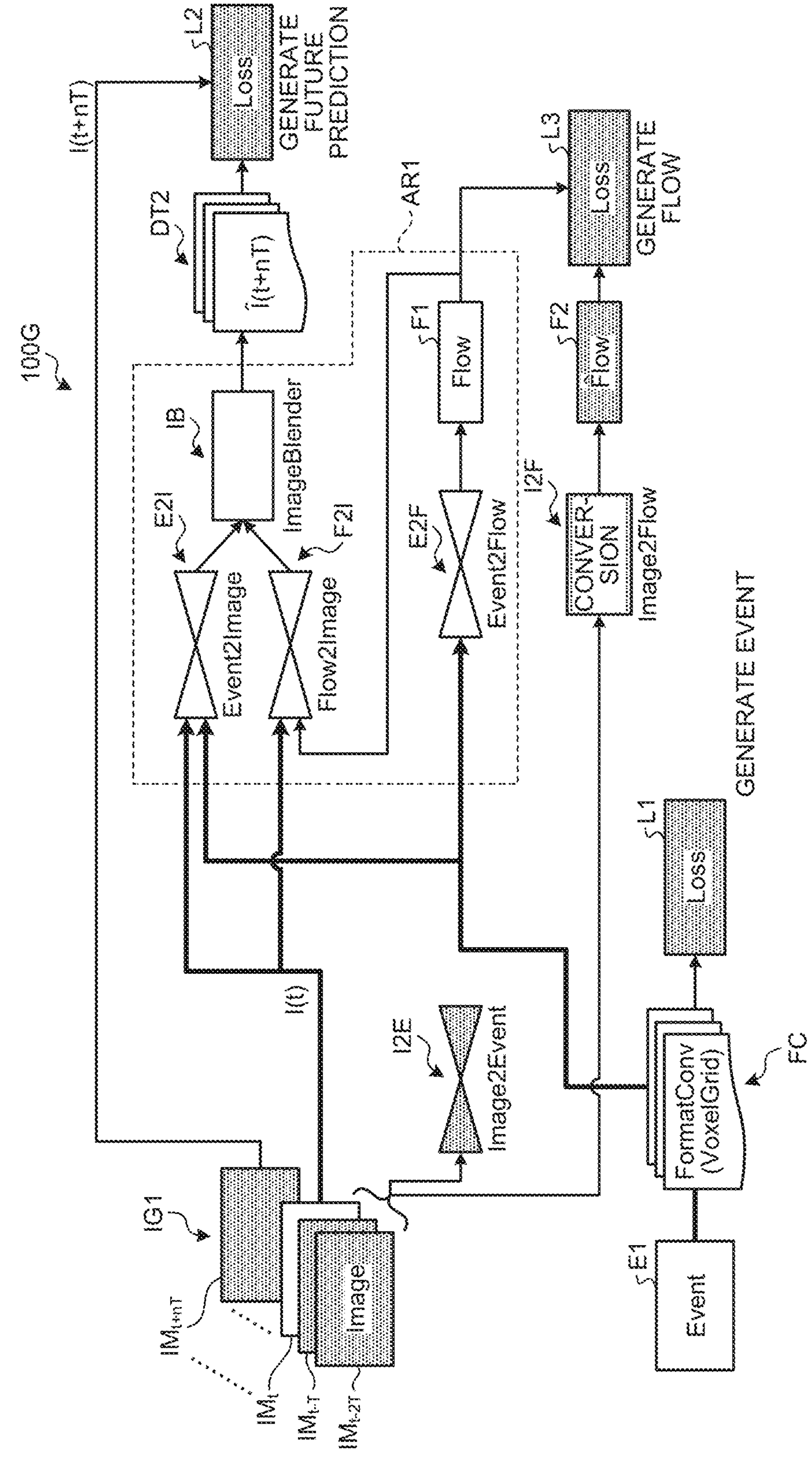
FIG. 25 is a diagram depicting a configuration example of the information processing device according to the ninth embodiment of the present disclosure.

Next, an outline of a configuration and processing of an information processing device according to a ninth embodiment will be described with reference to FIGS. 24 and 25. FIGS. 24 and 25 are diagrams depicting a configuration example of the information processing device according to the ninth embodiment of the present disclosure. Note that the similar points as those described above are denoted by the similar reference numerals, and the description thereof will be omitted as appropriate.

Hereinafter, the configuration of an information processing device 100G, information used for processing, and the like will be described with reference to FIG. 24, and then processing at the time of learning will be described. The information processing device 100G according to the ninth embodiment is different from the information processing device 100F according to the eighth embodiment in having a configuration related to a flow. Therefore, points related to the flow will be mainly described below, and description of the point similar to those of the information processing device 100F will be omitted as appropriate.

Furthermore, an event flow conversion E2F expressed as "Event2Flow" in FIG. 24 is a model that outputs information (signal) indicating a flow corresponding to information indicating an input event. The event flow conversion E2F uses the information indicating the event as an input and outputs information of the flow corresponding to the input. Flow data F1 denoted by "Flow" in FIG. 24 indicates flow data generated by the event flow conversion E2F. The event flow conversion E2F uses the information indicating the event as an input and outputs the flow data F1 corresponding to the input.

Furthermore, image flow conversion I2F described as "Image2Flow" in FIG. 24 is a model that outputs information (signal) indicating a flow corresponding to an input image. The image flow conversion I2F uses an image as an input and outputs information of a flow corresponding to the input. Flow data F2 denoted by "Flow" in FIG. 24 indicates flow data generated by the image flow conversion I2F. The image flow conversion I2F uses an image as an input and outputs flow data F2 corresponding to the input.

For example, the conversion processing into the flow by the image flow conversion I2F can be implemented by adopting any method (such as a standard method described below). For example, the conversion processing into the flow by the image flow conversion 12F may use a method related to an optical flow. For example, the conversion processing into the flow by the image flow conversion I2F may use a method related to the Flownet 2.0.

For example, the Flownet 2.0 is disclosed in the following document. Note that the Flownet 2.0 is merely an example, and any method such as the Lucas-Kanade method can be adopted as the conversion processing to the flow by the image flow conversion I2F without being limited to the Flownet 2.0.

FlowNet 2.0: Evolution of Optical Flow Estimation with Deep Networks, Eddy Ilg et al. <https://arxiv.org/pdf/1612.01925>

Furthermore, flow image conversion F2I denoted as "Flow2Image" in FIG. 24 is a model that outputs future information (image) from an image and information indicating a flow. For example, the flow image conversion F2I outputs information indicating where the pixel value has moved. The flow image conversion F2I uses the image and the information indicating the flow as an input, and outputs future information (image) corresponding to the input.

Furthermore, an image blender IB denoted as "ImageBlender" in FIG. 24 is a model that generates future information (image) using an output of the event image conversion E2I and an output of the flow image conversion F2I. The image blender IB uses an image generated by the event image conversion E2I (hereinafter, also referred to as a "first image") and an image generated by the flow image conversion F2I (hereinafter, also referred to as a "second image") as an input, and outputs future information (image) based on the input. In FIG. 24, as indicated by future information DT2, the image blender IB uses two images (image candidates) output from each of the event image conversion E2I and the flow image conversion F2I as an input, and outputs future information (image) corresponding to the input. The future information DT2 of FIG. 24 corresponds to the above-described combined data.

For example, the image blender IB uses the first image of the event image conversion E2I and the second image of the flow image conversion F2I as an input, and generates an image (also referred to as a "third image") corresponding to the future time point corresponding to the input. For example, the image blender IB may generate the third image by calculating a weighted average of the first image of the event image conversion E2I and the second image of the flow image conversion F2I. For example, the image blender IB may generate the third image by calculating a weighted average of the first image and the second image using a first weighting factor corresponding to the first image of the event image conversion E21 and a second weighting factor corresponding to the second image of the flow image conversion F2I.

Note that the above-described processing is merely an example, and the image blender IB may generate the third image by various methods. For example, the image blender IB may generate the third image by selecting an image to be used as future information from among the first image and the second image. For example, in a case where the second image is selected as the future information from among the first image and the second image, the image blender IB uses the second image as the third image. For example, the configuration corresponding to a region AR1 corresponds to the computation section and the data combining section described above. The configuration corresponding to the region AR1 can adopt any configuration such as one selected by the SoftMAX function, but this point will be described below.

In addition, a loss function L3 expressed as "Loss" in FIG. 24 is used at the time of training processing. For example, the loss function L3 is used for the training so that the output of the event flow conversion E2F and the output of the image flow conversion I2F approach each other. That is, the loss function L3 is used for the training so that the flow data F1 of the event flow conversion E2F and the flow data F2 of the image flow conversion I2F approach each other.

The information processing device 100G trains the model by the above-described configuration and information. For example, the information processing device 100G trains configurations corresponding to the image event conversion I2E and the region AR1. After training the image event conversion I2E, the information processing device 100G trains the configuration corresponding to the region AR1. For example, in a case where there is no test image for the image event conversion I2E, the information processing device 100G may provide self-supervised learning.

Here, at the time of training, it is desirable that the event information is framed to some extent before applying a light-weighted configuration to be described below. There are various methods of framing event information, but it is desirable to use technologies such as Voxel Grid and Event Spike Tensor capable of minimizing loss of information.

Voxel Grid is disclosed in the following document, for example. For example, Voxel Grid divides the number of events between frames, and adds up the divided events for each event in a frame shape.

Unsupervised Event-based Learning of Optical Flow, Depth, and Egomotion, Alex Zihao Zhu et al. <https://arxiv.org/abs/1812.08156>

Furthermore, Event Spike Tensor is disclosed in the following document, for example. For example, Event Spike Tensor divides the time between frames, and adds up the events input within the time in a frame shape for each polarity.

End-to-End Learning of Representations for Asynchronous Event-Based Data, Daniel Gehrig et al. <https://arxiv.org/abs/1904.08245>

In addition, an object recognition image and training data using an event sensor as an input are overwhelmingly smaller in volume than the case of a frame-based sensor, leading to a requirement of a mechanism capable of performing training even with a small number of images. Therefore, the information processing device 100G introduces a self-supervised learning mechanism.

For example, the information processing device 100G sets up a network that generates an event signal from a signal acquired on a frame basis, and generates an intermediate image so as to enable generation equivalent to an expression of Voxel Grid. In this case, the information processing device 100G defines the loss function L1 such that the generated signal corresponding to the event and the signal of the event after the actual format conversion converge, and trains the network of the image event conversion I2E.

Furthermore, a unit time T during the learning may be a relatively large value with respect to T in real time. For example, 16 frames during the learning may be regarded as an image of one frame at the time of execution, and may be defined as equivalent to a frame signal having a speed equal in real time. In this case, the frame image is a signal obtained by adding signals of 16 frames. For example, when the learning is performed by regarding 16 frames as one frame, the difference itself generated in the time of one frame unit can be easily calculated as an event generated in 1/16 of one frame in Voxel Grid or Event Spike Tensor. This leads to a light-weighted network during the learning, making it possible to perform, for example, the learning with a light-weight error function (L1 norm or L2 norm). Furthermore, in some cases, it is not necessary to specify an error function during the learning.

Then, the information processing device 100G generates the event flow conversion E2F corresponding to the optical flow in order to generate a future image. For example, an optical flow is used to estimate a movement destination when a pixel value having a certain luminance moves to another pixel. The information processing device 100G generates an optical flow for future prediction from an event and learns a teacher (data) from a frame difference.

In a case where the number of images is small in the optical flow, the information processing device 100G trains the network by self-supervised learning. For example, the information processing device 100G generates a signal of an optical flow from a difference between frame signals (for example, FlowNet 2.0 or the like). The information processing device 100G compares the generated flow signal (via the image flow conversion I2F) with the flow signal (via the event flow conversion E2F) generated by the event signal (for example, in the form of Voxel Grid) subjected to the format conversion so as to train a flow generation network. In this case, the loss function L3 is generated such that the event flow conversion E2F is the same as the image flow conversion I2F. Note that the image flow conversion I2F need no training and is defined as a conversion function.

Then, the information processing device 100G generates an image. For example, the information processing device 100G generates at least two candidate images, specifically, image generation (destination of the pixel value) from the flow and image generation (variation of the pixel value) from the event. As described above, the information processing device 100G performs processing of selecting from at least two or more images or blending two images taking the best of the both.

The first image candidate (first image) is generated by calculating the luminance value of the pixel from luminance change information of a single pixel itself. For example, the information processing device 100G uses the first image indicating the luminance change information for a sudden signal change from the outside of the angle of view having no information on the flow source.

Furthermore, the second image candidate (second image) is generated by estimating that a specific pixel in the most recent frame image has moved to another pixel based on the most recent frame image and the flow signal. The second image is generated by the flow image conversion F2I.

The first image and the second image are adjusted by the image blender IB, and several images are output as future images. At this time, the information processing device 100G executes training processing so that the network generates the future image by performing the training defining a signal of n frames ahead as a true value. For example, a signal of n frames ahead is determined by a delay amount until image display of an assumed system. In this case, in a case where n frame ahead is used in the training at a speed of 16 times, for example, defining 16 frame as equivalent to one frame, adjustment is made with 16n frame ahead as a true value. In this manner, the value of the parameter n may be determined based on the delay amount or the like.

As described above, the parameter n is determined by the system, but there is a possibility that the frame image is not normally generated due to an increase in computation volume or an increase in error in the far future (that is, n is large). Therefore, when the computation volume increases by a certain degree or more, the information processing device 100G may perform actions such as generation of an internal state variable such as a Busy flag and may interrupt the computation in the middle. In this manner, in a case where the computation is interrupted in the middle, the information processing device 100G may perform processing such as replacement of an image with an image (for example, a gray blurred image) or the like which is unlikely to invoke uncomfortable feeling. In this manner, it is allowable to provide a determination path of giving up (interrupting processing) when a certain internal computation time is exceeded.

Hereinafter, processing at the time of inference in the information processing device 100G will be described with reference to FIG. 25. Note that hatched configurations and information in FIG. 25 are not to be used in the inference processing depicted in FIG. 25. For example, it is indicated that the image event conversion I2E is not to be used in the inference processing depicted in FIG. 25. In this manner, the information processing device 100G performs inference without using the image event conversion I2E during the inference.

Furthermore, in the inference processing depicted in FIG. 25, the information processing device 100G executes, as the inference processing, processing of generating (predicting) an image corresponding to time point t+nT, which is a time later than time point t, by using an image $IM_t$ corresponding to time point t in the image group IG1. That is, the information processing device 100G generates a future image after n frames based on the one frame image and event group during the inference.

For example, the information processing device 100G generates future information (image) corresponding to the future time point t+nT by using the image $IM_t$ corresponding to time point t and the output of the format conversion FC corresponding to time point t. The image $IM_t$ corresponding to time point t, together with the output of the format conversion FC to which the event data E1 before time point t has been input, are input to the event image conversion E2I. The output of the format conversion FC to which the event data E1 before time point t has been input is input to the event flow conversion E2F. The image $IM_t$ corresponding to time point t and the output of the event flow conversion E2F are input to the flow image conversion F2I. The first image that is the output of the event image conversion E2I and the second image that is the output of the flow image conversion F2I are input to the image blender IB. With this configuration, the information processing device 100G generates the image output by the image blender IB as future information (image). Note that the above-described processing is merely an example, and the information processing device 100G may generate the future information using various types of information.

As described above, using the network trained by the training processing, the information processing device 100G generates one or more future prediction images from one latest frame image and event information at the time of inference. Note that the image finally selected and generated is determined by the delay amount of the system. For example, in a case where the system includes a plurality of display devices, the information processing device 100G may transmit an optimum generation signal to each display device.

Furthermore, at the time of inference, the network is fixed in the training, and thus, some networks used only at the time of training need not necessarily be used at the time of inference. For example, although the image event conversion I2E generates an event signal from frame information, it is sufficient to directly pass the event signal to the subsequent stage, and thus the output of the Voxel Grid may be directly input to the event flow conversion E2F. Furthermore, the Flow may be generated in a pre-trained network and combined with the frame signal for generation of the flow image conversion F2I. In addition, the event image conversion E2I may also be generated from the frame signal and the event signal. With these operations, an optimum image is finally generated according to the system. For example, in a case where the entire system (system) is trained on a time axis of 1/16 at the time of training, the generation of the Voxel Grid may be performed by using the event frame generated every time of 1/16 of the frame as the Voxel Grid as it is.

Note that, in a case where the latest information is the current state of each image at the time of inference, the event information may correspond to the current state. In this case, since the event is newer, frame information of the newest frame may be regarded as corresponding to the past. Furthermore, the future corresponds to an image to be generated.

[5-2-1. Example of Miniaturization of Configuration]

Here, an example of miniaturization of the configuration will be described. For example, the configuration corresponding to the region AR1 depicted in FIGS. 24 and 25 may be miniaturized by a certain method. For example, in order to finally lighten the entire network, the configurations (networks) corresponding to the region AR1 may be integrated. In this case, for example, the configuration corresponding to the region AR1 may be miniaturized by distillation. Furthermore, for example, the configuration corresponding to the region AR1 may be miniaturized by forming a ComputeInMemory (CiM) circuit configuration in order to enhance computation performance. With this operation, it is possible to form a light-weighted circuit for the configuration corresponding to the region AR1.

Furthermore, in order to achieve the light-weighted circuit described above, the event signal may be directly input to the network, and framing may be simultaneously performed inside the network. In this case, for example, by applying a spiking neural network (SNN) circuit to a main part close to the input of the network such as immediately after the input, further light-weighted circuit can be achieved.

5-3. Tenth Embodiment

Figure 26:
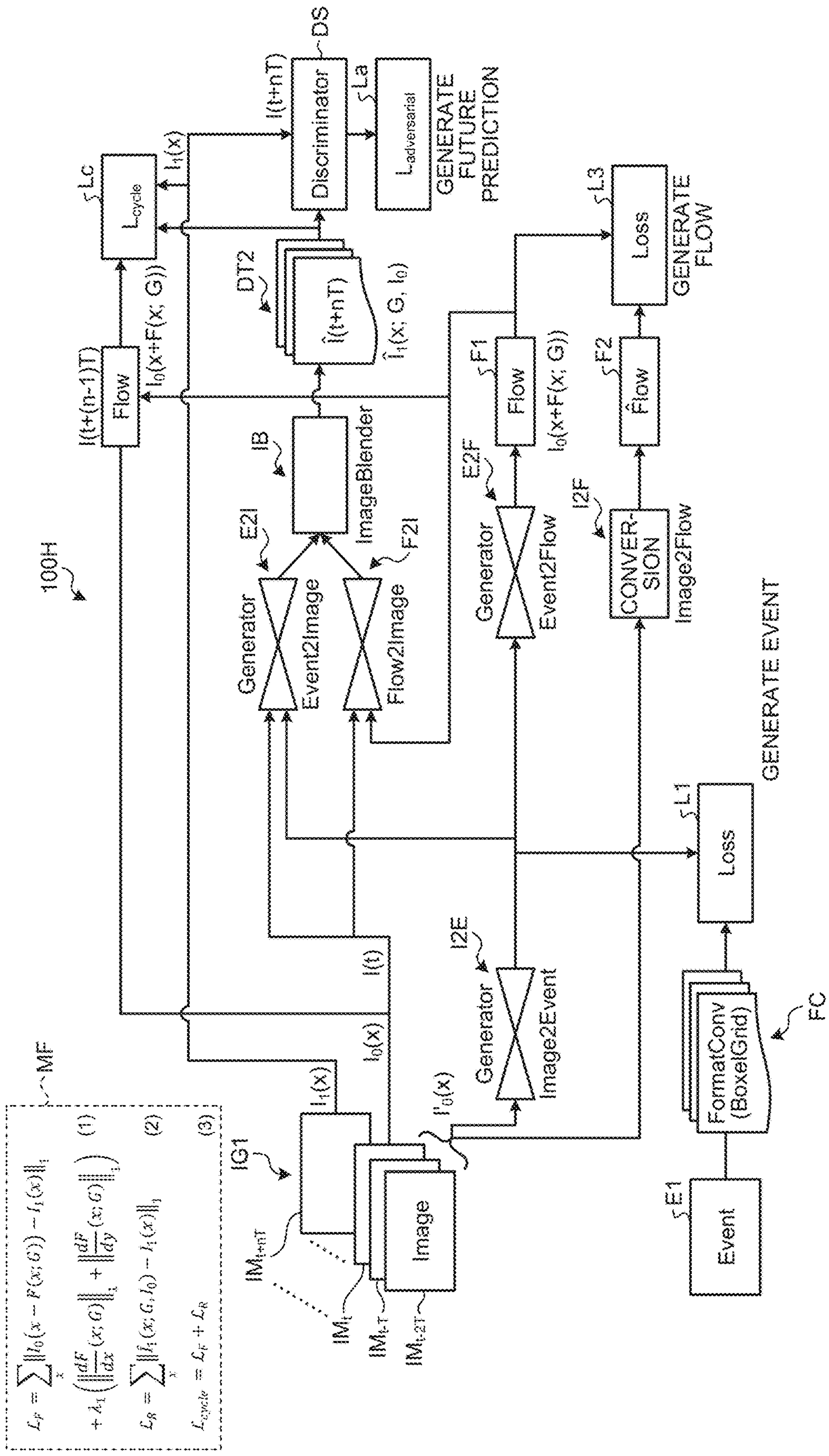
FIG. 26 is a diagram depicting a configuration example of an information processing device according to a tenth embodiment of the present disclosure.

Note that each configuration described above is merely an example, and the accuracy may be improved by performing the training using a Generative Adversarial Network (GAN). In this regard, an outline of a configuration and processing will be described as an information processing device according to a tenth embodiment with reference to FIG. 26. FIG. 26 is a diagram depicting a configuration example of the information processing device according to the tenth embodiment of the present disclosure. Note that the similar points as those described above are denoted by the similar reference numerals, and the description thereof will be omitted as appropriate.

An information processing device 100H according to the tenth embodiment has a different in that the loss function L2 in the information processing device 100G according to the ninth embodiment has a configuration related to GAN. Therefore, the configuration related to GAN will be mainly described below, and the description similar to those of the information processing device 100G will be omitted as appropriate.

As depicted in FIG. 26, the information processing device 100H includes, instead of the loss function L2, a loss function Lc expressed as "$L_{cycle}$" in FIG. 26 and a loss function La expressed as "$L_{adversial}$" in FIG. 26, together with a discriminator DS expressed as "Discriminator" in FIG. 26. For example, the loss function Lc is a function that uses, as an input, information connected with a base of an arrow whose point is connected to a rectangle denoted as "$L_{cycle}$" in FIG. 26. The loss function Lc is a loss function corresponding to Formulas (1) to (3) and the like included in a function group MF. Note that the function group MF depicted in FIG. 26 may be a part of the loss function Lc. For example, the loss function Lc may be a function using formulas other than Formulas (1) to (3) included in the function group MF. For example, the information processing device 100H performs training such that the loss function La and the loss function Lc converge by comparing the image with the ground truth image by the discriminator DS.

In the information processing device 100H, five configurations, namely, the image event conversion I2E, the image flow conversion I2F, the event image conversion E2I, the event flow conversion E2F, and the flow image conversion F2I, are set (used) as generators (generating devices). Furthermore, the information processing device 100H calculates the loss function La using the discriminator DS that compares the image with the actual ground truth image.

In order to converge the learning, the information processing device 100H uses a difference (hereinafter also referred to as "first difference") between the original image at t+nT ($I_1$ (x) in FIG. 26) and the image generated from the event image conversion E2I and the flow image conversion F2I ($I_1$ in FIG. 26 (x; G, $I_0$)). Furthermore, in order to converge the training, the information processing device 100H uses a difference between an original image ($I_1$(x) in FIG. 26) at t+nT and an image ($I_0$(x+F(x; G) in FIG. 26) generated using the event flow conversion E2F (hereinafter, this difference will be also referred to as a "second difference"). In this manner, the information processing device 100H uses two pieces of difference information, namely, the first difference and the second difference. For example, the information processing device 100H calculates a loss function Lc from a sum of losses of two differences, namely, the first difference and the second difference, and treats the obtained loss function Lc as a training parameter.

In this manner, in the information processing device 100H, the discriminator DS compares the generated image with the corresponding image of n frames ahead, and distinguishes whether or not there is no sense of discomfort. In this case, the loss function is determined based on the loss function La. Furthermore, in the information processing device 100H, the image generated as the image of the n-th frame ahead is compared with the signal of the current frame of the n-th frame ahead assumed to be equivalent at the input, and confirmed by the loss function Lc in order to compare with the image of the n-th frame ahead.

5-4. Eleventh Embodiment

Figure 27:
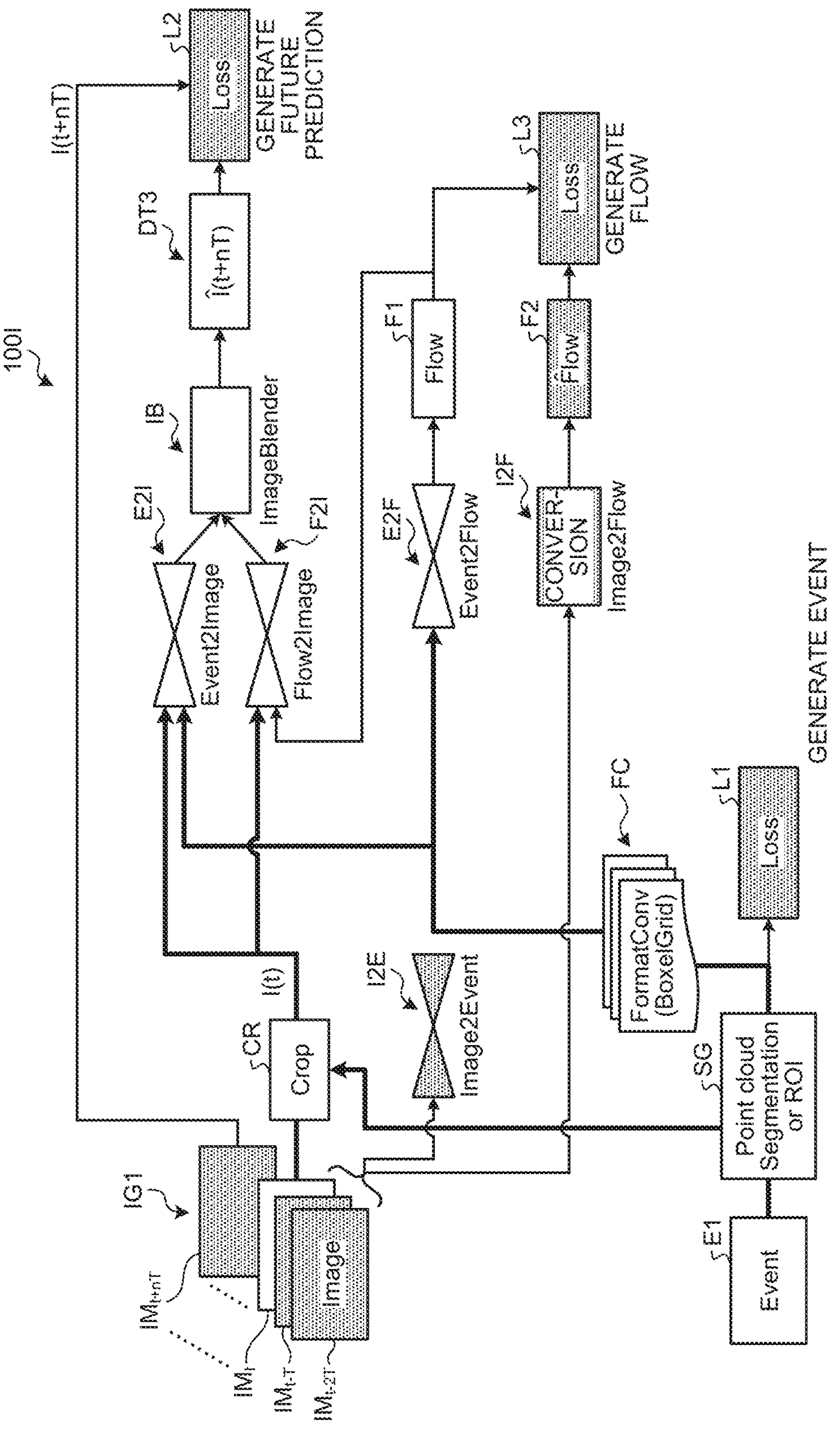
FIG. 27 is a diagram depicting a configuration example of an information processing device according to an eleventh embodiment of the present disclosure.

Note that, in the above-described configuration, it is allowable, at the time of inference, to extract only a portion where there is a change (a region where an event has occurred), and allowable to perform inference based on the extracted information. In this regard, an outline of a configuration and processing of an information processing device according to an eleventh embodiment will be described with reference to FIG. 27. FIG. 27 is a diagram depicting a configuration example of the information processing device according to the eleventh embodiment of the present disclosure. Note that the similar points as those described above are denoted by the similar reference numerals, and the description thereof will be omitted as appropriate. Note that hatched configurations and information in FIG. 27 are not to be used in the inference processing depicted in FIG. 27. For example, it is indicated that the image event conversion I2E is not to be used in the inference processing depicted in FIG. 27. In this manner, the information processing device 100G performs inference without using the image event conversion I2E during the inference.

Hereinafter, the configuration of the information processing device 100G, information used for processing, and the like will be described, and then processing at the time of learning will be described. An information processing device 100I according to the eleventh embodiment is different from the information processing device 100G according to the ninth embodiment in having a configuration of extracting information of a region where an event has occurred. Therefore, points related to the flow will be mainly described below, and description of the point similar to those of the information processing device 100G will be omitted as appropriate.

As depicted in FIG. 27, an information processing device 100I includes region extraction SG indicated as "Point cloud Segmentation or ROI" in FIG. 27 and cropping CR indicated as "Crop" in FIG. 27. For example, the region extraction SG extracts a region where an event has occurred using a technique related to a region of interest (ROI) or the like. For example, the region extraction SG outputs information indicating a region where an event has occurred in the image. The cropping CR uses the image and the output of the region extraction SG as an input, and outputs an image (cropping image) obtained by cropping the region indicated by the output of the region extraction SG among the input image. Then, the information processing device 100I generates future information using the cropping image output by the cropping CR. With this operation, the information processing device 100I can reduce the computation volume by narrowing the region.

Furthermore, in the inference processing depicted in FIG. 27, the information processing device 100I executes, as the inference processing, processing of generating (predicting) an image corresponding to time point t+nT, which is a time later than time point t, by using the image $IM_t$ corresponding to time point t in the image group IG1. That is, the information processing device 100I generates a future image after n frames based on the one frame image and event group during the inference.

For example, as indicated in future information DT3, the information processing device 100I generates future information (image) corresponding to the future time point t+nT by using the image $IM_t$ corresponding to time point t and the output of the format conversion FC corresponding to time point t. The image $IM_t$ corresponding to time point t, together with the output of the region extraction SG to which the event data E1 before time point t has been input, are input to the cropping CR. The output from the cropping CR, together with the output of the format conversion FC to which the output of the region extraction SG has been input, are input to the event image conversion E21. The output of the format conversion FC to which the output of the region extraction SG has been input is input to the event flow conversion E2F. The output from the cropping CR and the output of the event flow conversion E2F are input to the flow image conversion F2I. The first image that is the output of the event image conversion E2I and the second image that is the output of the flow image conversion F2I are input to the image blender IB. With this configuration, the information processing device 100I generates the image output by the image blender IB as future information (image). Note that the above-described processing is merely an example, and the information processing device 100I may generate the future information using various types of information.

In the example described above, it is assumed that only a part of the angle of view changes when the future image is generated. In this case, since the target of the computation region is narrowed down to a part of the region, the computation volume can be reduced by designating (extracting) the region to be passed to the generation circuit in advance. For example, in the information processing device 100I, a region is divided before computation is performed using a region having a high degree of activity generated from an event signal as area information, as a region-of-interest (ROI). For example, the ROI may be used to recognize a region of the object so as to achieve dynamic tracking.

5-5. Twelfth Embodiment

Figure 28:
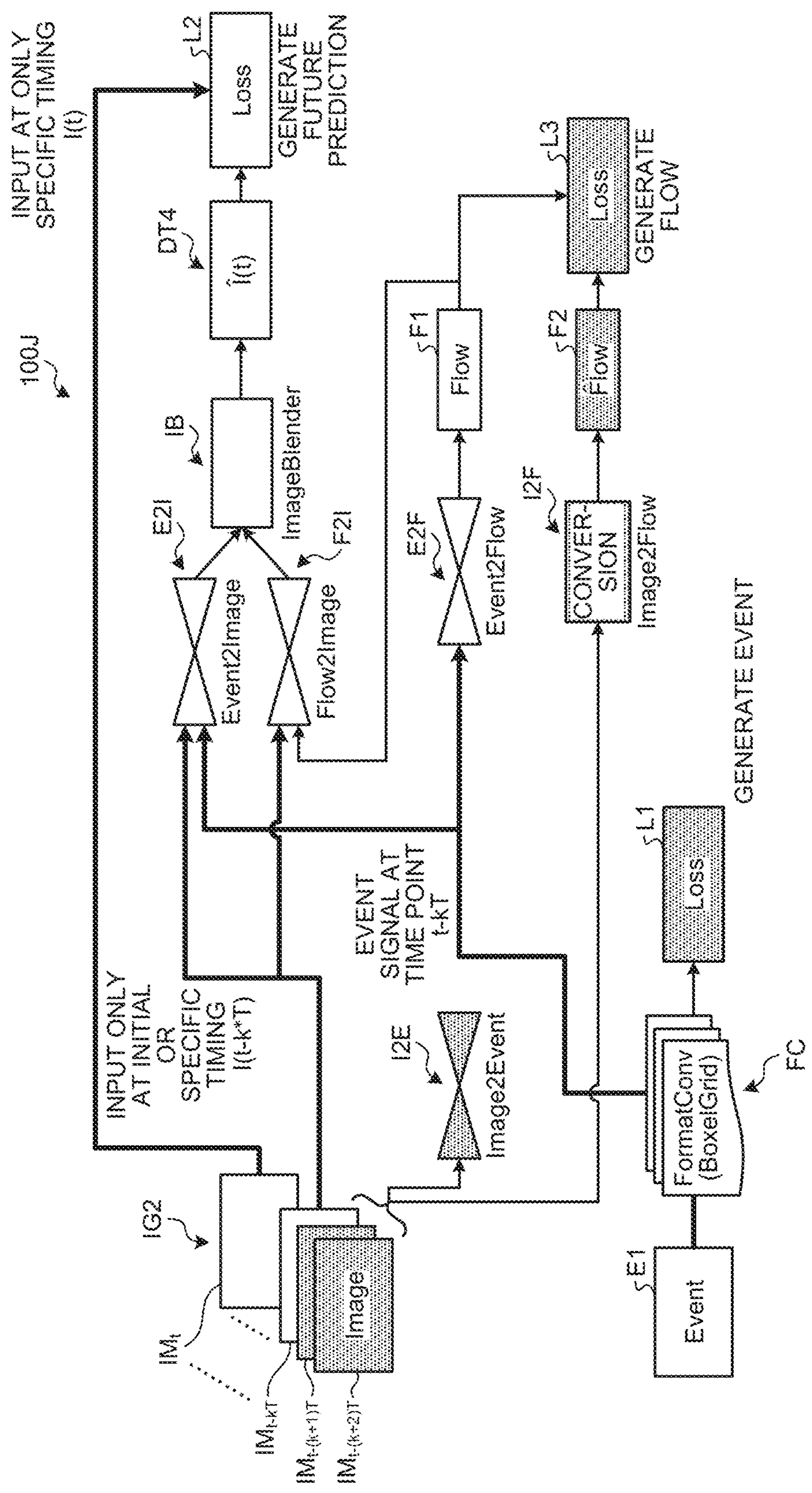
FIG. 28 is a diagram depicting a configuration example of an information processing device according to a twelfth embodiment of the present disclosure.

Note that each configuration described above is merely an example, and the network may be updated at the time of inference. In this regard, an outline of a configuration and processing of an information processing device according to a twelfth embodiment will be described with reference to FIG. 28. FIG. 28 is a diagram depicting a configuration example of the information processing device according to the twelfth embodiment of the present disclosure. Note that the similar points as those described above are denoted by the similar reference numerals, and the description thereof will be omitted as appropriate.

An image group IG2 in FIG. 28 includes a plurality of images such as an image $IM_{t-(k+2)T}$ corresponding to time point t−(k+2)T, an image $IM_{t-(k+1)T}$ corresponding to time point t−(k+1)T, an image $IM_{t-kT}$ corresponding to time point t−kT, and an image $IM_t$ corresponding to time point t. Note that "I(t)" depicted in FIG. 28 corresponds to the image $IM_t$, and "I(t−k*T)" corresponds to the image $IM_{t-kT}$.

In FIG. 28, as indicated by future information DT4, in a case where the image $IM_{t-kT}$ corresponding to time point t−kT and information of the event corresponding to the image $IM_{t-kT}$ have been input, an information processing device 100J outputs the image I(t) corresponding to time point t as future information. Then, the information processing device 100J updates the network using the image I(t) which is the generated future information DT4 and the image $IM_t$ corresponding to time point t in the image group IG2. The information processing device 100J performs training processing so that the image I(t), which is the generated future information DT4, approaches the image $IM_t$ corresponding to time point t. For example, the information processing device 100J updates parameters such as the event image conversion E2I, the flow image conversion F2I, and the image blender IB such that the image I(t) being the generated future information DT4 approaches the image $IM_t$ corresponding to time point t.

In this manner, the information processing device 100J uses, for example, a light-weighted network is used at the time of inference, and updates the network by comparing the image with an actual ground truth image at a certain frequency even at the time of inference. Note that it is desirable that the conceptual image (RGB image) is input to the computation device only at the beginning of use of the device, and the remaining future prediction is processed by the future prediction based on Event data. For example, the information processing device 100J may compare the generated image predicted at a certain time point with a frame image corresponding to the predicted generated image at a certain timing and may update the coefficient (parameter) for prediction. In this case, the information processing device 100J updates the event image conversion E2I, the flow image conversion F2I, and the like.

5-6. Thirteenth Embodiment

Figure 29:
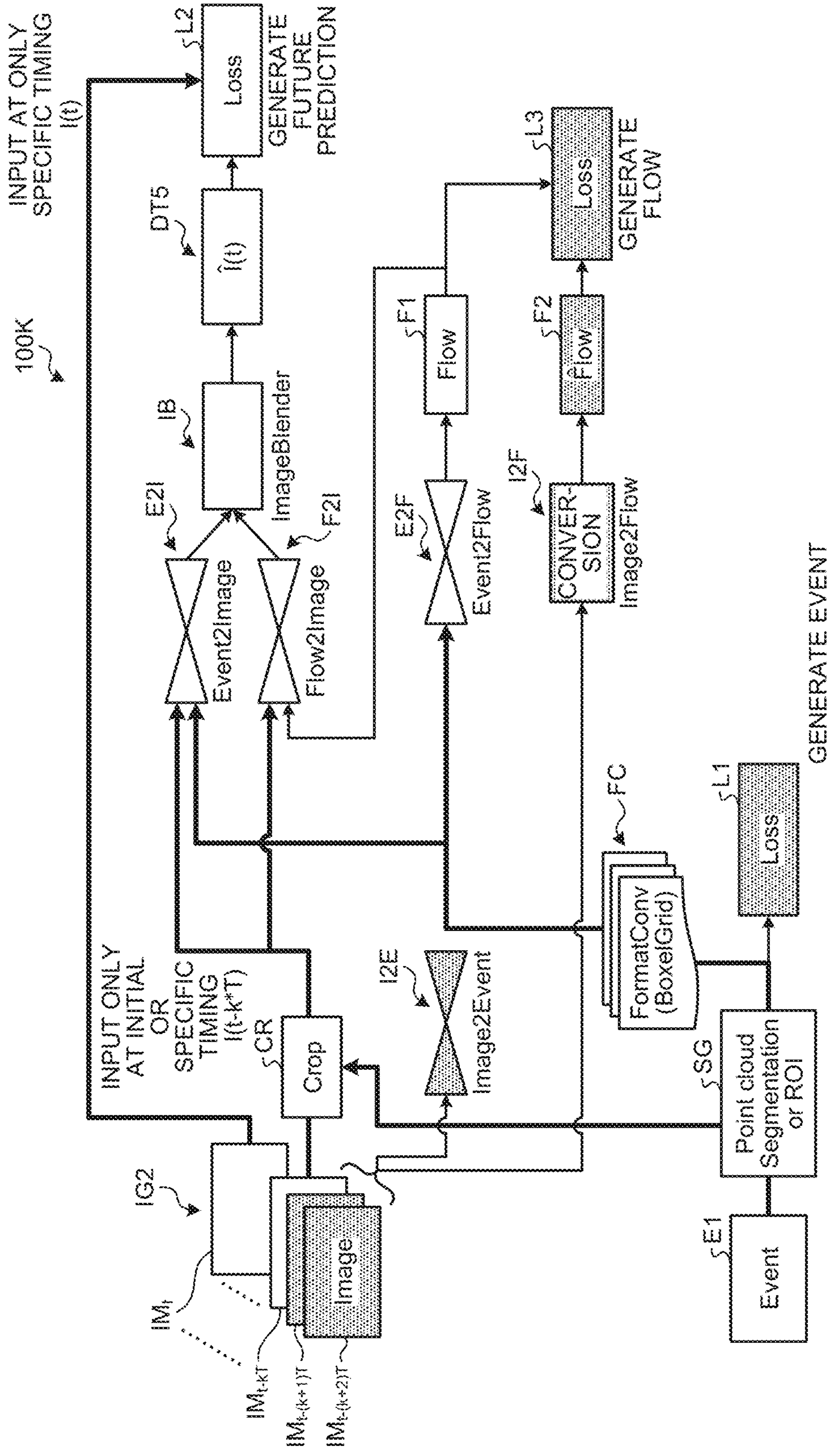
FIG. 29 is a diagram depicting a configuration example of an information processing device according to a thirteenth embodiment of the present disclosure.

Note that the network update at the time of the inference described above may also be performed at the inference based on the extracted information in the eleventh embodiment. In this regard, an outline of a configuration and processing of an information processing device according to the thirteenth embodiment will be described with reference to FIG. 29. FIG. 29 is a diagram depicting a configuration example of the information processing device according to the thirteenth embodiment of the present disclosure. Note that the similar points as those described above are denoted by the similar reference numerals, and the description thereof will be omitted as appropriate.

For example, an information processing device 100K according to the thirteenth embodiment is a combination of the information processing device 100I according to the eleventh embodiment and the information processing device 100J according to the twelfth embodiment. In other words, the information processing device 100K applies the network update at the time of inference described with the information processing device 100J according to the twelfth embodiment to the information processing device 100I according to the eleventh embodiment using only the information of the region where the event has occurred. Therefore, the configuration and processing of the information processing device 100K will be described in detail below.

5-7. Fourteenth Embodiment

Figure 30:
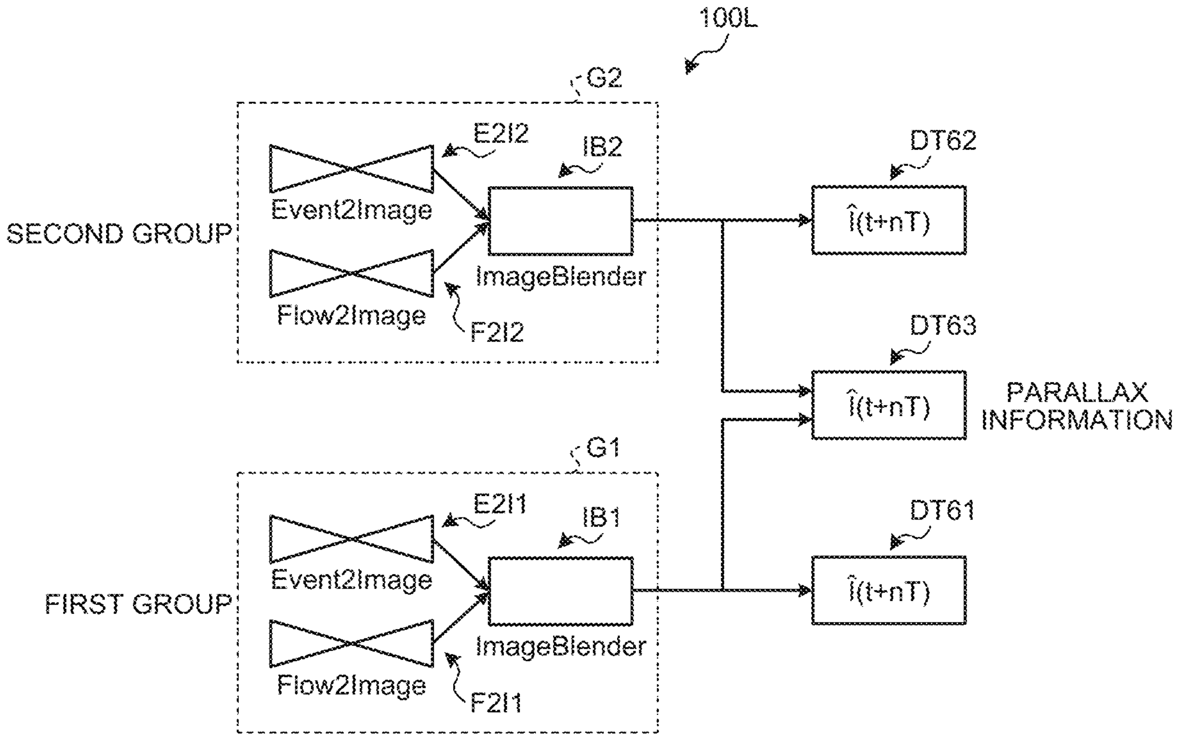
FIG. 30 is a diagram depicting a configuration example of an information processing device according to a fourteenth embodiment of the present disclosure.

Note that the information processing device may use at least two or more configurations (systems) that perform future prediction. For example, the information processing device may perform two future predictions of a future prediction, namely, a future prediction for a person's (user's) left eye (also simply referred to as "left eye") and a future prediction for a person's (user's) right eye (also simply referred to as "right eye"), and may calculate their parallax so as to perform distance measurement. In this regard, an outline of a configuration and processing of an information processing device according to a fourteenth embodiment will be described with reference to FIG. 30. FIG. 30 is a diagram depicting a configuration example of the information processing device according to the fourteenth embodiment of the present disclosure. Note that the similar points as those described above are denoted by the similar reference numerals, and the description thereof will be omitted as appropriate.

An information processing device 100L according to the fourteenth embodiment has a first group configuration G1 and a second group configuration G2. For example, the first group configuration G1 is used to generate future information DT61 which is future information for the right eye (also referred to as "first future information"). In FIG. 30, the first group configuration G1 includes event image conversion E2I1, flow image conversion F2I1, and an image blender IB1.

The event image conversion E2I1 has a function similar to the function of the event image conversion E2I in FIG. 24. The flow image conversion F2I1 has a function similar to the function of the flow image conversion F2I in FIG. 24. The image blender IB1 has a function similar to the function of the image blender IB in FIG. 24. The processing performed by the first group configuration G1 is similar to the processing performed by the event image conversion E2I, the flow image conversion F2I, and the image blender IB in FIG. 24 except that the future information is generated for the right eye, and thus, detailed description is omitted.

Furthermore, in the information processing device 100L, for example, the second group configuration G2 is used to generate future information DT62 which is future information for the left eye (also referred to as "second future information"). In FIG. 30, the second group configuration G2 includes event image conversion E2I2, flow image conversion F2I2, and an image blender IB2.

The event image conversion E2I2 has a function similar to the function of the event image conversion E2I in FIG. 24. The flow image conversion F2I2 has a function similar to the function of the flow image conversion F2I in FIG. 24. The image blender IB2 has a function similar to the function of the image blender IB in FIG. 24. The processing performed by the second group configuration G2 is similar to the processing performed by the event image conversion E2I, the flow image conversion F2I, and the image blender IB in FIG. 24 except that the future information is generated for the left eye, and thus, detailed description is omitted.

Furthermore, the information processing device 100L uses the first future information generated by the processing of the first group configuration G1 and the second future information generated by the processing of the second group configuration G2 to generate future parallax information (also referred to as "third future information"). In FIG. 30, the information processing device 100L uses the future information DT61 for the right eye generated by the first group configuration G1 and the future information DT62 for the left eye generated by the processing of the second group configuration G2 to generate parallax information DT63 which is the third future information. For example, by calculating a difference between the future information DT61 and the future information DT62, the information processing device 100L generates the parallax information DT63 as the future parallax information.

The information processing device 100L generates information including distance measurement information using parallax in a plurality of (two in FIG. 30) networks. The information processing device 100L generates parallax information by combining two or more paths of generating future information. For example, by calculating the parallax information of both (left and right), the information processing device 100L generates parallax information for performing three-dimensional distance measurement. With this operation, the information processing device 100L can generate left and right image information assumed to be displayed on a head-mounted display. Note that the left and right synchronization may be performed at the time of displaying information on a head-mounted display or the like, or may be performed at an internal processing stage such as at the time of computation by the information processing device 100L.

Note that the present technique can also have the following configurations.

(1)

An information processing device comprising:

an acquisition means that acquires first information which is part of information among information regarding a target region; and a generation means that generates, based on the first information acquired by the acquisition means, second information corresponding to a second time which is a time later than a first time which is a time corresponding to the first information.

(2)

The information processing device according to (1), wherein the acquisition means acquires the first information which is part of the information among the information regarding the target region detected by a sensor; and the generation means generates the second information predicted to be detected by the sensor in the second time, based on the first information.

(3)

The information processing device according to (1) or (2), wherein the acquisition means acquires the first information which is information of a portion necessary for processing performed by the generation means among the information regarding the target region.

(4)

The information processing device according to any one of (1) to (3), wherein the acquisition means acquires the first information which is information of a portion having a change in the first time among the information regarding the target region.

(5)

The information processing device according to any one of (1) to (4), wherein the acquisition means acquires the first information being sparse with respect to the information regarding the target region.

(6)

The information processing device according to any one of (1) to (5), wherein the acquisition means acquires the first information corresponding to a plurality of portions discretely located in the target region.

(7)

The information processing device according to (5), wherein the acquisition means acquires the first information corresponding to a portion of a predetermined ratio or less among the target region.

(8)

The information processing device according to any one of (1) to (7), wherein the generation means generates the second information which is encoded data corresponding to the second time.

(9)

The information processing device according to any one of (1) to (8), wherein the generation means generates the second information based on the first information and third information corresponding to a third time being a time earlier than the first time.

(10)

The information processing device according to (9), wherein the generation means generates the second information by using the third information generated before generation of the second information.

(11)

The information processing device according to (9) or (10), wherein the generation means generates the second information by using a learning model updated by using the third information.

(12)

The information processing device according to (11), wherein the generation means generates the second information by using the learning model updated based on the first information.

(13)

The information processing device according to (11) or (12), wherein the generation means generates the second information by using the learning model updated using the first information.

(14)

The information processing device according to any one of (1) to (13), further comprising a combining means that combines the second information with another information to generate combined information to be used for output.

(15)

The information processing device according to (14), wherein the generation means uses the first information to generate fourth information to be used for combining with the second information, and the combining means combines the second information with the fourth information to generate the combined information.

(16)

The information processing device according to (15), wherein the generation means generates the fourth information which is encoded data corresponding to the first time.

(17)

The information processing device according to any one of (1) to (16), wherein the acquisition means acquires the first information corresponding to part of the information regarding the target region that is an image, and the generation means generates the second information corresponding to the image of the second time based on the first information.

(18)

The information processing device according to (17), wherein the acquisition means acquires the first information corresponding to a pixel having a change in the image, and the generation means generates the second information corresponding to the image of the second time based on the first information.

(19)

An information processing method comprising:

acquiring first information which is part of information among information regarding a target region; and generating, based on the first information acquired, second information corresponding to a second time which is a time later than a first time which is a time corresponding to the first information.

(20)

An information processing program that causes processing to be executed, the processing comprising:

acquiring first information which is part of information among information regarding a target region; and generating, based on the first information acquired, second information corresponding to a second time which is a time later than a first time which is a time corresponding to the first information.

REFERENCE SIGNS LIST

100 INFORMATION PROCESSING DEVICE
101 INPUT MEANS
110 COMPUTATION MEANS
111 ACQUISITION MEANS
102 FUTURE INFORMATION GENERATION MEANS
103 PAST INFORMATION GENERATION MEANS
104 SIGNAL OUTPUT MEANS

The invention claimed is:

1. An information processing device comprising:

processing circuitry configured to acquire first information which is a part of information regarding a target region, which is sparse with respect to the information regarding the target region, and which corresponds to a plurality of portions discretely located in the target region; and generate, based on the first information, second information corresponding to a second time which is a time later than a first time which is a time corresponding to the first information.

2. The information processing device according to claim 1, wherein the first information is detected by a sensor; and the second information is information predicted to be detected by the sensor in the second time.

3. The information processing device according to claim 1, wherein the plurality of portions are necessary for generating the second information.

4. The information processing device according to claim 1, wherein the first information is information having a change in the first time among the information regarding the target region.

5. The information processing device according to claim 1, wherein the first information corresponds to a portion of a predetermined ratio or less among the target region.

6. The information processing device according to claim 1, wherein the second information is encoded data corresponding to the second time.

7. The information processing device according to claim 1, wherein the processing circuitry is configured to generate the second information based on the first information and third information corresponding to a third time being a time earlier than the first time.

8. The information processing device according to claim 7, wherein the third information is generated before generation of the second information.

9. The information processing device according to claim 7, wherein the processing circuitry is configured to generate the second information by using a learning model updated by using the third information.

10. The information processing device according to claim 9, wherein the learning model is updated based on the first information.

11. The information processing device according to claim 9, wherein the learning model is updated using the first information.

12. The information processing device according to claim 1, comprising a wherein the processing circuitry is configured to combine the second information with another information to generate combined information to be used for output.

13. The information processing device according to claim 12, wherein the processing circuitry is configured to:

use the first information to generate fourth information to be used for combining with the second information, and combine the second information with the fourth information to generate the combined information.

14. The information processing device according to claim 13, wherein the fourth information is encoded data corresponding to the first time.

15. The information processing device according to claim 1, wherein the target region is an image, and the second information corresponds to the image of the second time.

16. The information processing device according to claim 15, wherein the first information corresponds to a pixel having a change in the image.

17. An information processing method comprising:

acquiring first information which is a part of information regarding a target region, which is sparse with respect to the information regarding the target region, and which corresponds to a plurality of portions discretely located in the target region; and generating, based on the first information acquired, second information corresponding to a second time which is a time later than a first time which is a time corresponding to the first information.

18. A non-transitory computer readable medium storing an information processing program that when executed by a computer causes the computer to perform a method, the method comprising:

acquiring first information which is a part of information regarding a target region, which is sparse with respect to the information regarding the target region, and which corresponds to a plurality of portions discretely located in the target region; and generating, based on the first information acquired, second information corresponding to a second time which is a time later than a first time which is a time corresponding to the first information.

* * * * *